United States Patent [19]

Kaiser et al.

[11] Patent Number: 4,916,642

[45] Date of Patent: Apr. 10, 1990

[54] ENVIRONMENTAL CONTROL WITH MULTIPLE ZONE CENTRAL PROCESSOR MEANS

[75] Inventors: Frederick P. Kaiser, Orange; Theodore R. Lapp, Mission Viejo, both of Calif.

[73] Assignee: O-Com, Inc., Santa Ana, Calif.

[21] Appl. No.: 6,325

[22] Filed: Jan. 14, 1987

Related U.S. Application Data

[63] Continuation of Ser. No. 661,558, Oct. 17, 1984, abandoned, which is a continuation-in-part of Ser. No. 655,081, Sep. 26, 1984, Pat. No. 4,742,475, which is a continuation-in-part of Ser. No. 288,740, Jul. 31, 1981, abandoned.

[51] Int. Cl.$^4$ .......................... G06F 13/12; F24F 7/00
[52] U.S. Cl. ...................................... 364/550; 165/22; 236/49.3; 340/310 R; 364/493; 364/506
[58] Field of Search .............. 364/131, 132, 138, 418, 364/493, 506, 557, 514, 550, 551, 900; 340/310 A, 310 CP, 310 R, 870.03, 870.11, 870.02; 165/22; 98/116; 236/49, 51, 49.1, 49.2, 49.3, 49.4, 49.5; 318/603, 640

[56] References Cited

U.S. PATENT DOCUMENTS

| | | | |
|---|---|---|---|
| 3,840,176 | 10/1974 | Baysinger | 236/44 R |
| 3,914,677 | 10/1975 | MacWade et al. | 318/640 X |
| 4,055,113 | 10/1977 | Monroe | 98/116 X |
| 4,078,721 | 3/1978 | Okuhara | 236/49 |
| 4,162,486 | 7/1979 | Wyler | 340/310 CP X |
| 4,205,381 | 5/1980 | Games et al. | 364/505 |
| 4,232,531 | 11/1980 | Mangam Jr. et al. | 62/171 |
| 4,234,926 | 11/1980 | Wallace et al. | 364/551 |
| 4,298,860 | 11/1981 | Norberg et al. | 340/825.07 |
| 4,338,556 | 7/1982 | Hetzel | 318/640 X |
| 4,350,286 | 9/1982 | Sutoh et al. | 236/49 X |

*Primary Examiner*—Kevin J. Teska
*Attorney, Agent, or Firm*—Fitch, Even Tabin & Flannery

[57] ABSTRACT

An environmental control system for use in a greenhouse or another structure which requires the control of an ambient condition regulating element in response to a plurality of sensed parameters. The system includes a plurality of sensor elements and actuator elements, which communicate with a central control through communication interface units. In an illustrated embodiment the interface units communicate over previously installed AC power lines by frequency shift keyed signals. The central control unit maintains a protocol where, in response to operator inputs, addresses are assigned to different peripheral control elements to configure the system. The system is configured by assigning sets of equipment to separate zones of the structure which are individually controlled. All peripheral control elements are addressed in one zone before sequencing to control the next zone. When a peripheral control element is addressed, a sensor responds with data corresponding to a sensed parameter and an actuator executes a command. The central control executes a control program which is input by the operator for the most efficient energy use by the system. The central control is embodied as a personal computer including an expansion board and a specialized communication circuit which provides data transfer between the communication interface units and the personal computer.

5 Claims, 11 Drawing Sheets

| TABLE OF REMOTE ELEMENTS ||
|---|---|
| PREFIX | REMOTE ELEMENT ADDRESS (SUFFIX) |
| 1 | VENT MOTOR ACTUATOR |
| 2 | INDOOR SENSOR |
| 3 | OUTDOOR SENSOR |
| 4,5 OR 6 | ADDRESS RECEIVER - ONE ACTUATOR |
| 7 | ADDRESS RECEIVER - EIGHT ACTUATORS |
| 8 | ADDRESS RECEIVER - PROPORTIONAL CONTROL |

FIG. 4

| STAGE # | TEMP. | ROOF VENT OPENING | SIDE VENT OPENING | FAN #1 | FAN #2 | PAD PUMP |
|---|---|---|---|---|---|---|
| 7 | 86 | 00% | 99% | on | on | on |
| 6 | 84 | 00% | 99% | on | off | on |
| 5 | 80 | 99% | 80% | off | off | off |
| 4 | 77 | 70% | 15% | off | off | off |
| 3 | 74 | 45% | 10% | off | off | off |
| 2 | 72 | 25% | 5% | off | off | off |
| 1 | 71 | 5% | 0% | off | off | off |
| 0 | 70 | 0% | 0% | off | off | off |

FIG. 5

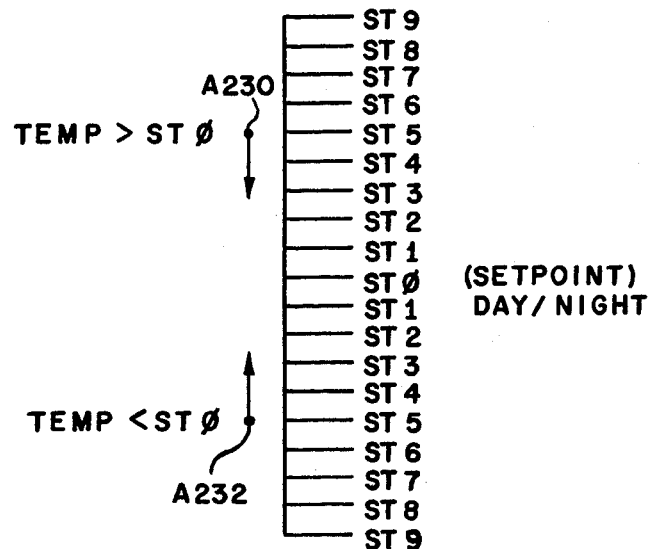

FIG. 6

| BYTE ADDRESS | RAM MAP |
|---|---|
| 36 | ARES CHECK FILE |
| 37 | ARES CHECK FILE |
| 38 | ARES CHECK FILE |
| 39 | ARES CHECK FILE |
| 40 | ARES CHECK FILE |
| 41 | RESTART TIMER (SUB SECONDS) |
| 42 | RESTART TIMER (SECONDS) |
| 43 | RESTART TIMER (MINUTES) |
| 46 | MS DATA BYTE MF AR |
| 47 | LS DATA BYTE MF AR |
| 48 | IDENTIFICATION MF AR |
| 49 | MINUTES FOR HOST TIMEOUT |
| 50 | SECONDS |
| 51 | SUB-SECONDS |
| 52 | MINUTES |
| 53 | HOUR |
| 54 | YEAR |
| 55 | DAY |
| 56 | MONTH |
| 57 | MOST RECENT Rx BYTE |
| 58 | C-REGISTER CONTENTS |
| 59 | RECEIVED DATA |
| 60 | RECEIVED DATA |
| 61 | COMMANDS TO BE SENT |
| 62 | T2 T1 |
| 63 | T0 TP |

FIG. 13

ENVIRONMENTAL CONTROL WITH MULTIPLE ZONE CENTRAL PROCESSOR MEANS

CROSS-REFERENCE TO RELATED APPLICATIONS

This application is a continuation of application Ser. No. 661,558 filed Oct. 17, 1984, now abandoned, which is a continuation-in-part of application Ser. No. 655,081, filed on Sept. 26, 1984 now U.S. Pat. No. 4,742,475, in the names of Fred P. Kaiser and Theodore R. Lapp, now U.S. Pat. No. 4,742,475, which is itself a continuation-in-part of application Ser. No. 288,740, filed Jul. 31, 1981, now abandoned. The disclosure of Kaiser, et al. Ser. Nos. 288,740 and 655,081 is hereby expressly incorporated by reference.

BACKGROUND OF THE INVENTION

This invention pertains generally to control systems of remote controlled devices, and more particularly to environmental control systems for use in greenhouses or the like which preferably utilize the existing AC power transmission lines for interelement communication within the system.

Control of the temperature, humidity and ambient measurements in a greenhouse, or the like, to enable the control of the environment therein can necessitate monitoring and controlling numerous sensing and control devices at various locations within the structure being controlled. Due to the large number of measurements and functions that are needed to be performed, computer based or computer compatible systems have been used to centrally control the monitoring and operating functions of an environmental control system, such as in a large buildings.

With the advent of complex systems of environmental control a great need has evolved for monitoring systems capable of monitoring a myriad of points with respect to conditions which must be continuously observed in order to assure proper and safe operation. Similarly, alarm conditions at the points must be immediately discovered and corrected, thus requiring systems that are capable of indicating alarm conditions as well as scanning the points.

Due to the great number of remote field points that must be monitored, conventional monitoring systems utilize a control center as a receiving and sending station for monitoring the remote points which generally are scattered over great distances. Some conventional systems utilize pulse width modulation or frequency modulation to address and monitor the field points. However, these prior systems have been extremely complex and expensive and are desirable only where extremely great distances are involved or in underdeveloped or inaccessible locations where the use of cable wires is impractical.

For environmental control in a building or complex of buildings, pulse width modulation and frequency modulation systems are generally impractical, and systems for such application are generally based on the matrix concept as can be seen from U.S. Pat. No. 3,300,759. While the use of matrices and binary coded addresses for field points does reduce the number of wires required below the number of wires required for each point to be individually connected to a central control, the reduction in the number of wires is not as great as is desirable, and the number of wires required is dependent upon the number of points monitored thereby decreasing system flexibility. These conventional systems suffer from the disadvantages of difficult installation due to the different addresses associated with each field location and difficult system modification once the system has been installed as the well as high cost of wiring. That is, each field location must be designed for a specific address thereby increasing inventory and installation time; and, if at any time additional field locations are desired to expand the system beyond the original design, additional wires are required to be installed.

Systems have been devised for reducing the number of dedicated communications wires required, such as shown in U.S. Pat. No. 3,613,092, but still suffer from the cost, time, and reliability disadvantages of requiring dedicated custom installed communication wiring.

Greenhouses provide weather protection and the correct environmental conditions for growing plants. Cultivation of the plants requires the atmosphere within the greenhouse to be maintained at a selected temperature and humidity level. Factors affecting the greenhouse atmosphere include heat gains and heat losses. For example, during long periods of sun exposure, abnormal amounts of solar energy enter the greenhouse which tends to raise the temperature.

Logical control of greenhouse environmental conditions has heretofore utilized, for example, 24 volt control systems with relays and solenoids individually wired together and strung out, or a computer based equivalent system (such as a programmable controller) with dedicated wires for communication and control lines strung out and wired among all control points and sensors. These systems have proved less than adequate in terms of cost, time for installation, and ease of maintenance, repair, and update of equipment. Additionally, communication among elements of the environmental control system is restricted to a dedicated control and custom wiring. Expansion requires new wiring in an installation, and modification requires rewiring the system.

A significant disadvantage of many prior systems involves system reliability and maintainability where a breakdown in one part of the system could effectively shut down other parts of the system. Thus, to increase reliability, redundant or backup equipment is often necessitated.

SUMMARY OF THE INVENTION

Accordingly, a general object of the invention is to provide a new and improved communication and control system which has general applicability to environmental control systems for structures of all kinds including, but not limited to, greenhouses.

A further object of the present invention is to provide a control system which does not require dedicated or independent wires for communication.

Another object of the present invention is to permit the expansion of a control system without the necessity of installing additional wires from a control center.

Still another object of the present invention is to utilize similar communication interfaces between elements of the system.

Yet another object of the present invention is to provide an improved environmental control system, especially suited for use in a greenhouse, which provides for communication between a central controller and one or more peripheral elements located in one or more zones of the system utilizing the existing AC power wiring.

Still further, and object of the invention is to provide a system control unit based upon a general purpose personal computer which can be adapted to communicate over the existing AC power wiring.

These objectives are achieved in a preferred embodiment of the invention comprising a system control communicating over the existing AC power wiring to a plurality of peripheral control elements in each zone of a structure including a plurality of sensors and actuators. The sensors can be interrogated to provide information as to the environmental conditions existing inside or outside a zone of the structure and the actuators can be commanded to control various actuated devices capable of varying the environment of a zone of the structure.

Transmission between the system control and a peripheral control element is preferably by means of communication interface units which are adapted to communicate bidirectionally over the existing AC power lines of a structure. In a preferred implementation an interface unit includes a transmitter which converts digital data into a frequency shift keyed signal for application to the AC power line and a receiver which converts a frequency shift keyed signal from the AC power line into digital data. The system control generally utilizes a receiver and transmitter for bidirectional communication as does a peripheral control element for a sensor which is to be interrogated and must reply. A peripheral control element for an actuator which receives commands need only be provided with a receiver.

The system, when used as an environmental control for a greenhouse, preferably includes three types of peripheral control elements which receive communications from the system controller. Initially, a vent motor control is provided to regulate the opening of a vent in the greenhouse. The vent control receives a command indicative of the percent amount that a vent should be opened and independently controls the vent to that opening. A second type of peripheral control element, termed an address receiver, is used to actuate devices which need only on-off switching for operation, and optionally the amount of time they are to operate. A third type of peripheral control element, a remote sensor controller, control the sensors needed by the system and in response to an interrogation will reply with data indicating the value of a sensed operating parameter.

The system control comprises a personal computer based controller which has means for receiving operator input, means for communicating with the peripheral control elements of the sensors and actuators of a system configuration, means for displaying information to an operator, and means for controlling the system according to a predetermined control law.

The personal computer is adapted to control the system by being provided with an interface means which plugs into an expansion slot of the computer and provides for bidirectional information flow between a microprocessor based communications circuit and the computer. Pursuant to the commands of the personal computer the communications circuit controls a communication interface circuit to interrogate sensors and commands actuators according to the predetermined control law.

In an illustrated application of the system for the environmental control of a greenhouse, a predetermined control law based upon indoor temperature is used. A plurality of temperature stages using different system configurations and states of the peripheral control elements are programmed to produce control signals which regulate the inside temperature in the direction of a set point. In an illustrated implementation, exhaust fans, cooling pads, and vents are controlled by the peripheral control elements and actuate those devices for cooling the structure when the temperature is in excess of the set point. The exhaust fans, vents, and a heating means are controlled by the peripheral control elements and actuate those elements for heating the structure when the temperature is below the set point. Various combinations of these elements and various settings for each element are programmed for each temperature stage.

The actual temperature is periodically measured by a temperature sensor interrogated by the system control through a peripheral control element. As the temperature moves toward the set point through the different stages, different configurations and states of the equipment are used to produce a programed control. The different configurations are easily programmed by assigning particular equipment to separate addresses and accessing those addresses needed for a particular stage.

This operation has an advantage where the stages can be programmed for maximizing the cooling or heating effect the farther the actual temperature is from the set point and gradually reducing the effect through different configurations and stages as the actual temperature approaches the set point. This approach not only saves energy in an environmental control system, but for a greenhouse is particularly advantageous because it reduces the thermal shock to growing plants produced by normal on-off thermostatic controls.

In a greenhouse environment, additional features provided for the control system are a provision for multiple sets points and modification of the control program either by manual overrides or special condition overrides which are sensed. For multiple temperature sets points, a photo cell which is interrogated by the system control through a peripheral control element provides information about the light level in the environment. The system uses this light level information to switch from a day temperature set point to a night temperature set point and a separately staged program. Overrides to control the openings of vents for extreme environmental conditions such as rain and wind are provided by interrogating sensors which detect such conditions with a peripheral control element. Further, the control program can be modified automatically by sensing the outdoor temperature through a suitable peripheral control element. A manual override which directly controls the positioning of the vents is additionally provided to modify the program control.

Additionally, a multi-function address receiver for a greenhouse is used to provide misting control by regulating the on-off states of a plurality of misting heads. Each head can be programmed to be operated for a set amount of time and then turned off by the address receiver without the necessity of continuous command and monitoring by the central control system.

These and other objects, features, and advantages of the invention will become more apparent and clearly understood from a reading of the following detailed description with reference to the accompanying drawings in which:

BRIEF DESCRIPTION OF THE DRAWINGS

FIG. 4 is a tabular representation of the prefix and suffix protocols assigned to different types of peripheral control elements which are illustrated in FIG. 1;

FIG. 5 is a tabular representation of a generalized control law which is executed by the system control to regulate the environment of a greenhouse;

FIG. 6 is a pictorial representation of the search function of the system which operates at a current stage in the temperature control program;

FIG. 13 is a detailed tabular representation of the information stored temporarily in the random access memory of the microprocessor of the reset control and communications circuit illustrated in FIG. 10.

DETAILED DESCRIPTION OF THE PREFERRED EMBODIMENTS

Figure 1:
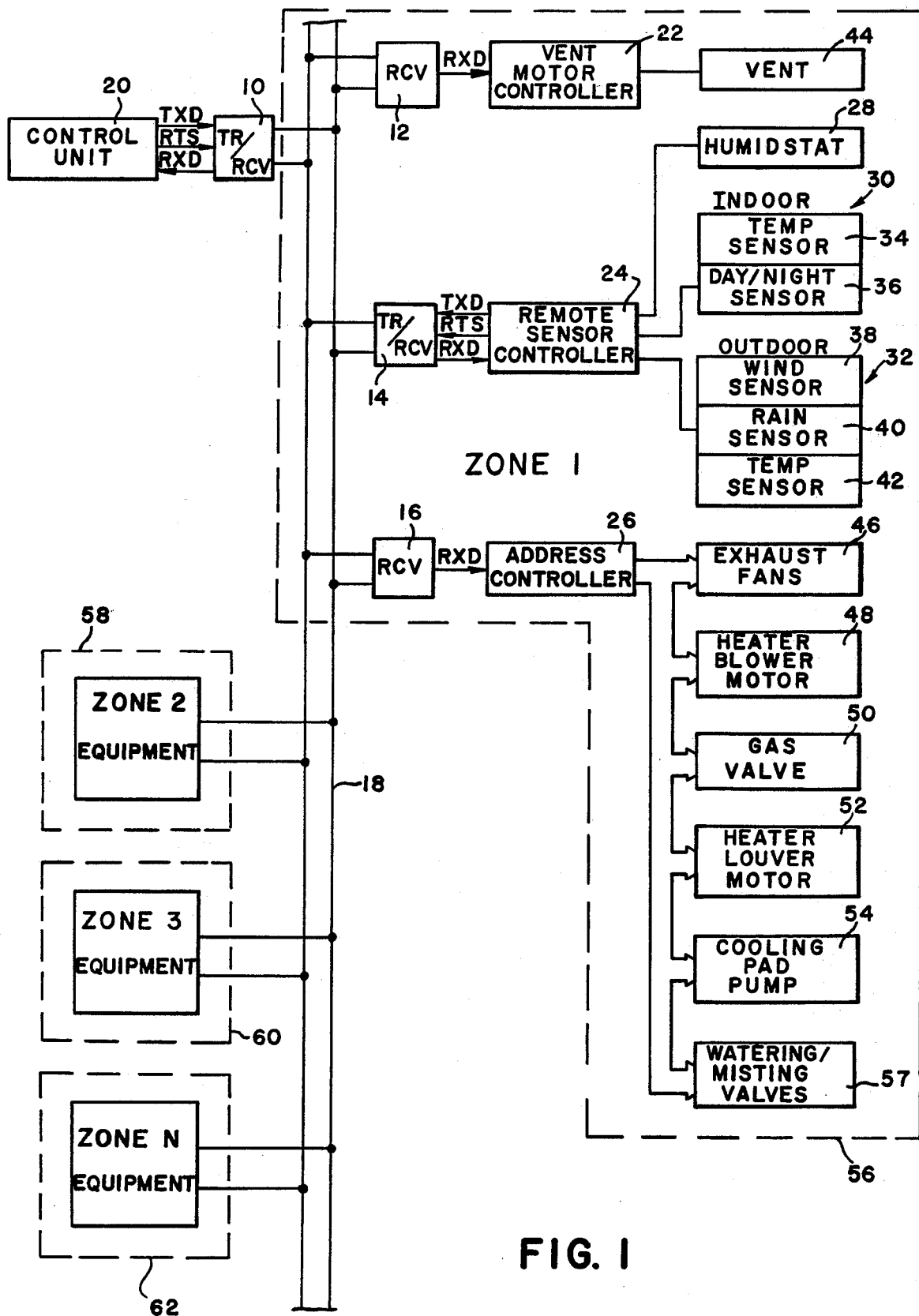
FIG. 1 is a system block diagram of an environmental control system for multiple zones of a structure which is constructed in accordance with the invention.

For ease of description like elements in the different FIGURES will be referenced by similar reference numerals. Also, for signals which have a low logic level as their true state, an * will precede the signal name to designate the condition.

Referring now to the drawings, and particularly FIG. 1, a system implementation of the present invention is illustrated. A plurality of modular communication interface means 10, 12, 14 and 16 are coupled to an AC power transmission line 18 and are additionally coupled individually to a system control unit 20, and peripheral control elements 22, 24 and 26 respectively. The communication interface means provide for bidirectional or unidirectional data communication via the power line 18 between the control unit 20 and the peripheral control elements 22, 24 and 26.

In the implementation shown address, command, and data signals are communicated between the elements of the system by utilizing the existing power wiring thereby eliminating the necessity for special dedicated communication wiring. It will, however, become apparent that it is also possible to use radio frequency communication or dedicated communication lines rather than the installed power lines and still use many of the claimed features of the present invention as will be appreciated hereinafter from reading the detailed description of the system.

The system provides a control in which a number of remote elements comprising the peripheral control elements are remotely controlled by the central control unit. In this manner, any number of peripheral control elements can be coupled to the power line and remotely controlled by the control unit. This produces a system which is very flexible in configuration and which is easily adapted for many environmental control situations. For example, for the environmental control of a greenhouse one or more zones, 56, 58, 60 and 62 can be assigned to the central control unit and controlled efficiently thereby. Further, each separate zone can be controlled with a different system configuration based upon the number and type of peripheral control elements which are located therein and which are assigned addresses by the central control 20.

The peripheral control elements can be of many types. In the illustrated implementation of FIG. 1 there are three types illustrated especially suitable for greenhouse environment control. For example, one of the peripheral control elements may be a remote sensor control 24 which provides communication between the central control unit and a number of sensors, such as, a humidistat 28, an indoor sensor 30, and an outdoor sensor 32. The indoor sensor 30 may have a temperature sensor 24 which can be of the aspirator type, and a (photo cell which embodies a day/night sensor 36 and provides an indication of when to change a temperature set point. The outdoor sensor 32 can include a wind sensor 38, a rain sensor 40, and an outdoor temperature sensor 42.

Another type of peripheral control element includes a vent motor controller 22 which provides regulation of the speed and direction of a motor which opens and closes a vent 44. The vent motor controller 22 thus functions as a programmable actuator to provide incremental control over vent opening in a greenhouse structure. The vents produce a ventilation of the structure as commanded by the control unit 20.

A third type of peripheral control element is an address controller 26 which controls a number of relays to operate on/off type switching functions for various system elements. In the configuration illustrated, the address controller 26 can be requested to operate such devices as exhaust fans 46, a blower motor 48 for a heater, a gas valve 50 for the heater, a louver motor 52 for the heater, or a cooling pad pump 54. Additionally, the timed control of a plurality of misting heads 57 can be provided by the address controller 26.

Each zone 1, 2, 3 . . . N contains equipment similar to that described for zone 1 (56) but can include more, less, or different equipment types depending on the needs of the environment for the particular zone. Additionally, as will become apparent, the equipment of different zones can be configured separately depending on need. The communication protocol and system information transfer remain identical for each zone.

Because interface means 10 is a bidirectional communication device Which output information to the peripheral control elements and receives information from them, it includes a transmitter and a receiver. Likewise, the interface communication means 14 Which communicates with the remote sensor controller 24 contains a transmitter and receiver. The interface means 12 and the interface means 16 which communicate with the vent motor controller 22 and address controller 26, respectively, need only to accept commands from the control unit 20, and therefore, include only a receiver.

The interface means receive digital data from a communicating device and transform that data into a frequency shift keyed signal which can be inductively coupled to the power line 18. For those interface means that contain a transmitter, data is transferred to the interface means by a data line TxD and transmission is enabled by a ready to send signal RTS. For the receiving function, data is transferred over the data line RxD to the communicating device after it has been converted from a frequency shift keyed signal to digital data. The system protocol and timing of the transmission and receipt of the information which include addresses, commands, interrogations, and data will be more fully described hereinafter.

In the illustrated embodiment, each control unit 20 performs a number of system functions. First, the control unit 20 provides a microprocessor based control system comprising a central processing unit (CPU) and associated memory coupled to an input means, such as a keyboard, and to a display means, such as a CRT monitor, and a communication device for transmitting digital data to the interface means 10. Additionally, the control unit 20 of the environmental control system in accordance with stored program instructions and user input data performs the functions of system configuration, peripheral element control, task sequencing, communication linkage and protocol, system diagnostics, user interface, storage, and archiving of the system data.

The communication and timing protocol used by the system will now be more fully explained with respect to FIGS. 3A-3C and FIG. 4. Each peripheral control element, whether controlling a sensor element or an actuator element, is enabled only in response to being addressed by the central control unit 20. Any number of addresses are possible with this system but a capability of 1000 is shown in the illustrated embodiment. A timing diagram illustrating the communication to the separate zones is shown in the FIG. 3A where a frame of N zones is disclosed as being two minutes in length. The frame is subdivided into N subframes each containing the communication for the peripheral control elements of that zone. A zone communication begins with an interrogation of the sensors assigned to a particular zone followed by commands to the actuators assigned to that zone. Depending upon the number of peripheral control elements, each zone communications is variable in length, but the zone communications are known in total to be less than the two minute frame.

Figure 3A:
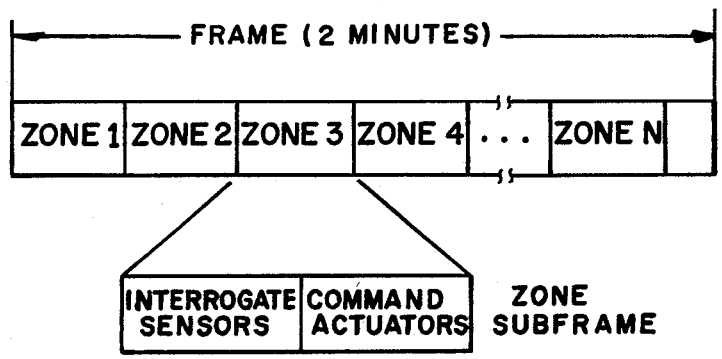
FIGS. 3A, 3B and 3C are pictorial representations of the system communication protocol for the environmental control system illustrated in FIG. 1.
Figure 3B:
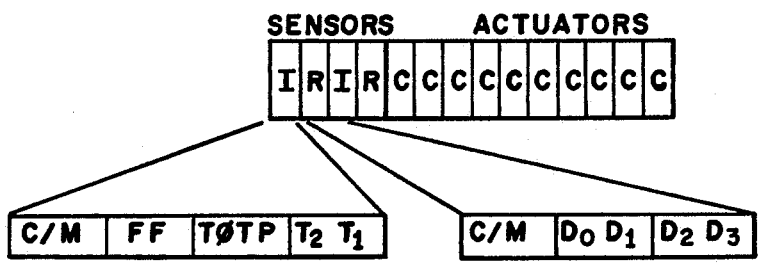
Figure 3C:
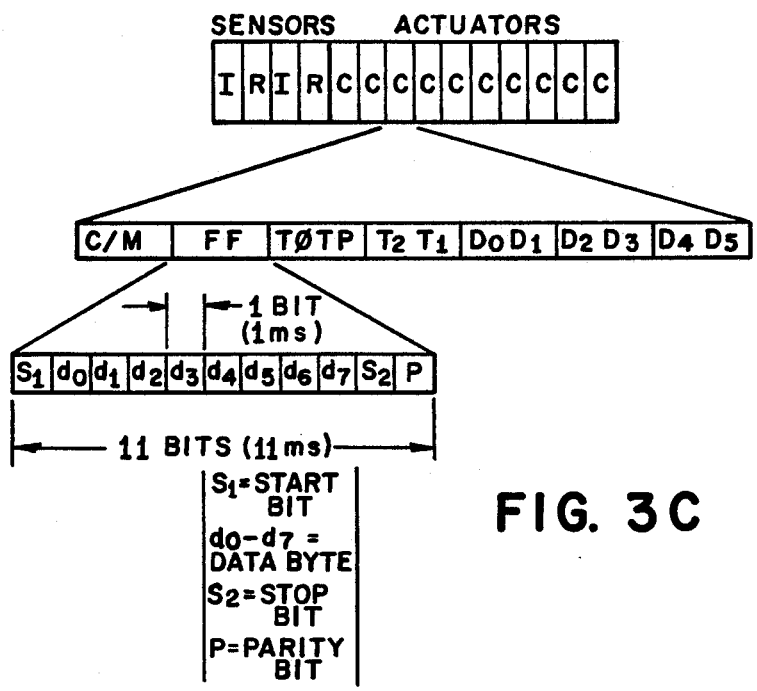

A zone communication, FIGS. 3B, 3C, further is divided into the sensor interrogation portion, where in response interrogation I the sensor transmits a reply R, and a command portion. After all sensors of a zone have been interrogated, the zone communication enters the command portion where each assigned peripheral control element is given a command C.

Therefore, if a peripheral control element is assigned to any one of the subframes, it is addressed once every two minutes in the present scheme. Thereafter, the cycle repeats until the system configuration is changed. It is seen that by using this type of protocol that every remote element can be addressed uniquely and further that a system can be configured merely by assigning addresses. Further the time sequence in which the remote elements are controlled during a frame is dependent upon the zone assigned. This provides an extremely flexible system for providing control with different configurations of elements and for sequencing the elements at different times. Thus, all remote elements have not only a physical separation by address but a time separation by zone.

Further, the protocol for the system has a particular transmission format for the control unit and for the peripheral control elements. The nature of the transmission is dependent upon the type of remote element being addressed. Each piece of equipment has information transmitted into it in the form of a communication data string as shown in FIGS. 3B and 3C. The communication string from the central control unit 20 initiates with a C/M bit group, a constant mark, which may be as long as 30 bits is used to lock up the phase locked loop in the receiver of the addressed element. Next, there is a byte containing a unique word FF hexidecimal, which indicates an address of a peripheral control element will follow. Thereafter, each piece of equipment receives an address of the form a byte TOTP, and a byte T2T1. TP is a four bit BCD prefix or function code representing the type of peripheral control element and TOT1 are two four bit BCD suffix nibbles representing the particular one of the elements addressed. Each byte is actually eleven bits, transmitted at one millisec/bit. This is standard asynchronous data transmission protocol where each 8-bit data byte is headed by a start bit and ended with a stop bit which is followed by a parity bit.

In the present protocol, see FIG. 4, all addresses beginning with the prefix 1 are vent motor controllers 22. Since there are 100 addresses within the prefix range, there can be as many as 100 different vent motor controllers addressed by the system. Similarly, all addresses with a prefix 2 are indoor sensors 30 and all addresses with a prefix 3 are outdoor sensors 32. All address prefixes between 4-8 are for devices controlled by address controllers 26. A prefix of 7 can be used for a multi-function address receiver. FIG. 4 illustrates a table for the present prefixes and their assignments to the peripheral control elements of the present configuration. It should be readily apparent that such assignment is arbitrary, and can be changed for convenience, or to order the sequencing of the peripheral control elements if necessary.

The format for the transmission to interrogate a sensor is different from that which is used to command an actuator. For an actuator, see FIG. 3C, a byte D0D1 following the address byte T2T1 represents a command consisting of two nibbles. The two nibbles, D0 and D1, are used by the peripheral control element to decode an operational state from the data received, such as the amount of opening for a vent, if a vent motor controller 22, or which particular relay to close, if an address controller 26.

For a multi-function address receiver command bytes D2D3, D4D5 are appended to provide an indication of the amount of time an actuated device is to be operated.

For a remote sensor, the format changes to that illustrated in FIG. 3B where the control unit 20 sends in burst transmission the C/M constant mark, the unique character FF, the prefix, and the suffix. This sequence forms an interrogation of a remote sensor and causes the peripheral control device for the sensor to reply. Upon receipt of the transmission from a control unit, the peripheral control element of a sensor will reply with a similar constant mark C/M and two bytes of data D0D1, and D2D3. The data lines contain the sensed information indicative of an operating parameter of the system.

As an example, for the particular implementation shown when the address prefix is 2, the central control unit 20 sends an address (prefix and suffix) to an indoor sensor and waits for temperature data D0D1 and a light level data D2D3 to be returned to the control unit. In a similar manner, when the prefix is 3 the control unit 20 sends the address of an outdoor sensor to a peripheral control element. Temperature data D0D1 and rain or wind data D2D3 is then returned to the control unit immediately upon reception of the interrogation. In instances of transmission for either actuators or sensors to insure reliable data transfer the control unit repeats the transmission five times before ending the data burst. The remote controlled elements must receive two valid identical messages in sequence before they will be accepted and acted upon.

At the end of each transmission, the control unit 20 will select the address of a peripheral control element and check to see if it has been assigned to the system configuration by a user. If so, it commences transmission in the formats previously described depending upon whether the address has been assigned to a peripheral control element which regulates a sensor or an actuator. During the initial transmission, the information is proceeded by the unique word FF which serves to synchronize all remote elements and indicates that some remote element address is forthcoming. The remote element whose address follows the unique word will then take appropriate action while all others go back to waiting for another unique character before they are enabled.

Figure 2:
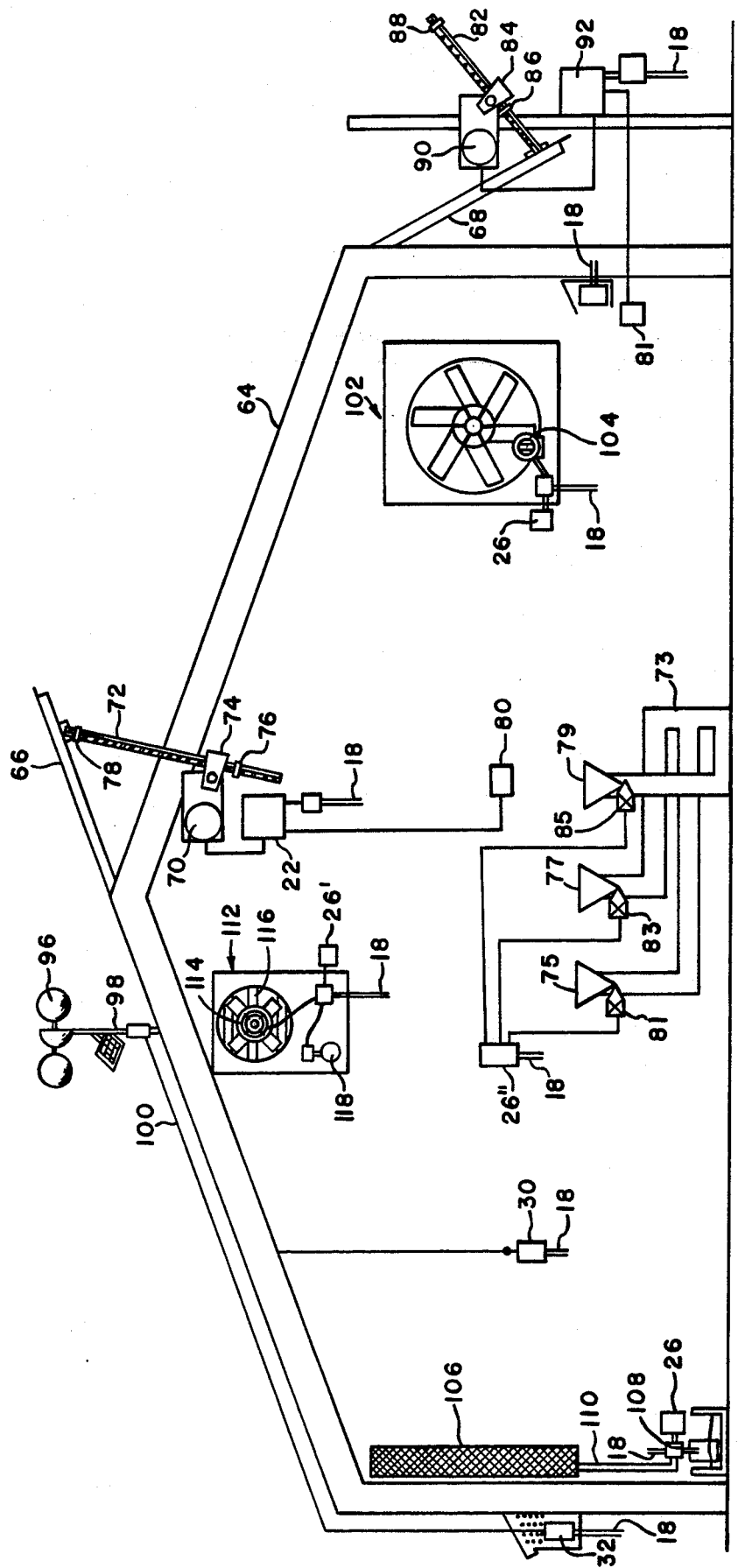
FIG. 2 is a pictorial diagram of a greenhouse zone with a plurality of peripheral control elements for heating and cooling the structure which are controlled by the environmental control system illustrated in FIG. 1.

FIG. 2 shows a structure 64, more particularly one zone of a greenhouse, advantageously using an environmental control system according to the present invention. The implementation shown is merely illustrative and many other remote controlled elements or different configurations could be used with the present system. The greenhouse zone structure 64 includes a number of ventilation structures to provide circulation of inside and outside air, including a top vent 66 and a side vent 68. Generally these vent structures are operated by a motor 70, in the case of vent 66, operating a rack 72 and pinion assembly 74. The motor 70 rotates the pinion of the assembly 74 to position the rack 72 and open or close the vent as determined by a vent motor controller 22.

The open position and closed position of the vent are sensed by striking plates 76 and 78 contacting limit switches on the pinion assembly 74. Further, the pinion of assembly 74 has a group of magnets disposed in opposition to a sensor which, when the pinion rotates, counts the teeth of that gear so as to provide a position indication to the vent motor controller 22. Further a manual vent control 80 is provided to override any remote control signals to the vent controller 22.

In a similar manner, the vent 68 operates by means of a rack 82 and pinion assembly 84 positioning the vent between the full open position, as indicated by striking plate 86, and the full closed position, as indicated by striking plate 88. The vent motor 90 rotates the pinion of the assembly 84 to provide positioning in response to commands from a vent motor controller 92. The vent motor controller 92 receives feedback signals from the pinion assembly 84 indicating the number of teeth sensed on the pinion gear by a magnetic sensing assembly and the extreme position signals for the full open and full closed positions. As was the case for the vent motor controller 22, the vent motor controller 92 is connected to a manual control unit 94 which may override the remote signals sent to the vent motor controller.

A central control unit 20 remotely controls the two or more vent motor controllers shown in the drawing to open and close the vents according to a programmed control for the zone. In addition, the control unit 20 can interrogate a number of remote sensors such as an indoor sensor 30 and an outdoor sensor 32. The indoor sensor 30 comprises a temperature sensor and a day/night sensor for indicating the light level in the greenhouse structure 64. The temperature sensor indicates the indoor or actual temperature of the greenhouse structure 64 which can be used to control that actual indoor temperature to any particular set point.

Another remote sensor that is interrogated by the control unit 20 is the outdoor sensor 32. The outdoor sensor 32 is coupled to a roof mounted structure including an anemometer 96 and a rain pad 98. The anemometer 96 gives information as to wind speed as an electrical signal, and the rain pad 98 transmits information as an electrical signal with respect to rain conditions via a cable 100 to the outdoor sensor 32. In addition the outdoor sensor 32 comprises a temperature sensor to give an indication of the outside temperature conditions.

For air circulation purposes, an exhaust fan 102 is used in combination with an address controller 26. The address controller 26 is adapted to switch the fan motor 104 on and off according to instructions from the control unit 20. The exhaust fan 102 may be used in combination with either heating or cooling means and the vents to produce an increase or a decrease in the indoor temperature of the greenhouse structure 64. Normally, several exhaust fans for a particular zone of a greenhouse will be controlled in parallel in this manner.

Generally, the cooling means are embodied as a cooling pad 106 through which water is circulated by a pump 100 fed by conduit 110. The pump 108 is remotely actuated by means of a address controller 26 which is under control of the central control unit 20. Turning on the cooling pad motor 108 allows water to circulate through the cooling pads 106 and by evaporization provide an air conditioning effect for the inside of the greenhouse structure 64.

Additionally, a heating unit 112 is supplied to raise the ambient temperature when needed. The heating unit 112 includes a blower motor 114 for exhausting heated air through a controllable louver structure 116 which directs the heated air flow. In addition a gas valve 118 may be proportionally opened to provide the fuel for burning needed to heat the air. These devices are remotely actuated by address controller 26' which is under the supervision of the central control unit 20.

A misting system-consisting of misting or watering heads 75, 77, and 79 can be used to provide humidity control and adequate soil moisture. The heads 75, 77, and 79, which can be located as selected positions around the controlled zone, are coupled to a source of water 73 through controllable valves 81, 83, and 85 respectively. The valves are each actuated, as to time and opening, by multi-function address controller 26" which is under the supervision of the central control unit 20.

In a programmed sequence having different stages and temperature set points, the vents, exhaust fans, and cooling pads can be used to reduce the temperature in the greenhouse structure 64 where the vents, exhaust fans, and the heating unit can be used to increase the temperature in the greenhouse structure. The indoor sensor 30 allows a switch from two temperature programs on the basis of whether the light level indicates a day or night condition in the structure 64. In addition the indoor sensor 30 provides a signal for indicating the actual temperature of the structure. The outdoor sensor 52 can provide wind and rain overrides for the particular program executed by the central control unit 20 or a modification of that program because of outdoor temperature.

All of the peripheral control elements of the greenhouse environmental control zone shown in FIG. 2 communicate over the existing AC power lines shown schematically as connections 18. It is evident that other devices could additionally be included in this control and that more than just one or two of each device could be used. For example, if a number of vents or exhaust fans are to be used together, although they have different physical peripheral control elements, they can be operated simultaneously by assigning each device the same address in the protocol. Each peripheral control element communicates with the control unit 20 over the AC power lines as described previously to provide an integrated environmental control for a greenhouse. Further, it should be noted that the equipment shown will allow control of only one zone illustrated for the greenhouse. Of course, similar zones could be set up by duplicating the equipment shown and controlling them with the control unit 20 as described by this zone. A more detailed description of the operation and structure of the disclosed peripheral control elements is found in the referenced applications of Kaiser, et al.

The central control unit, through an operator input means, allows an operator to assign any of the prefix and suffix addresses to a particular peripheral central element to configure the system. Once the addresses of the equipment for each zone have been assigned, the particular control program for the structure can be produced. The actual control program is provided by using the operator input means to define a temperature set point and a number of temperature stages or ranges away from that set point. Each stage, STO STN, is defined as a temperature range which is compared to the actually measured temperature. If the actual temperature happens to fall within a range then peripheral control elements assigned to that range are to be operated at the state stored for that stage. The operator thus has a wide latitude to program the operational states of any of the assigned devices for all the stages which he sets up. Thus, after selecting stage boundaries, he selects equipment to be assigned to each stage. When the equipment is selected an operational state for each device in a stage is accomplished.

Generally, referring now to FIG. 6, the stage boundaries, equipment assignments, and operational states are calculated to move the actual temperature to the set point. For example, in the figure the set point temperature is labled as stage STO, and the actual temperature is shown at point A230 as greater than the set point temperature. Initially, the system will determine which stage the actual temperature is within, ST5, and operate the cooling equipment accordingly. Operation of the cooling equipment controlled by the peripheral control elements should move the actual temperature to stage ST4 where another operational group of equipment is used. The operation should move the temperature to ST3 and so on until the set point is reached. Similarly, if the actual temperature is below the set point, such as at point A232, the stage ST5 equipment will be operated to heat the greenhouse and move the actual temperature through the stages toward the set point. The set point temperature, as is seen, can require the programming of operational states for temperatures above and below the set point, and different programs for day operation and night operation.

In the automatic mode, the central control 20 steps through the programs for the day and night entries controlling the elements as set forth for the programs in the sequential operation. Day to night program change is provided by the light level indication from the indoor sensor. An example of a program and the operating conditions for each element in a program of seven stages is shown in FIG. 5. The ideal temperature of a structure at any given time is the set point and is the temperature boundary for stage zero of the control. Thereafter, temperature is controlled in stages or bands which can be of any temperature range desired. For each temperature band or stage, the percentage of vent opening and all remote on/off and proportional control functions are stored thereby fully configuring the system for each stage. Whenever the temperature rises above or falls below a stage temperature, the system begins operating all of the equipment which is assigned to the new stage. A built in delay avoids excessive cycling of the equipment as the temperature passes through the stage thresholds. Light levels are metered by the indoor sensor and determine whether the control unit operates in either the day or night program. The day-night switch over can also set on the basis of time. The day program can be run during the night or the night program can be run during the day by either covering the photocell developing the light level control signal or by shining a light on the photocell as needed. It is also possible to adjust the threshold of the light sensor so that during dark cloudy periods when photosynthesis is not occurring the control unit will switch to the night mode and reduce the use of energy by the control elements.

Figure 7:
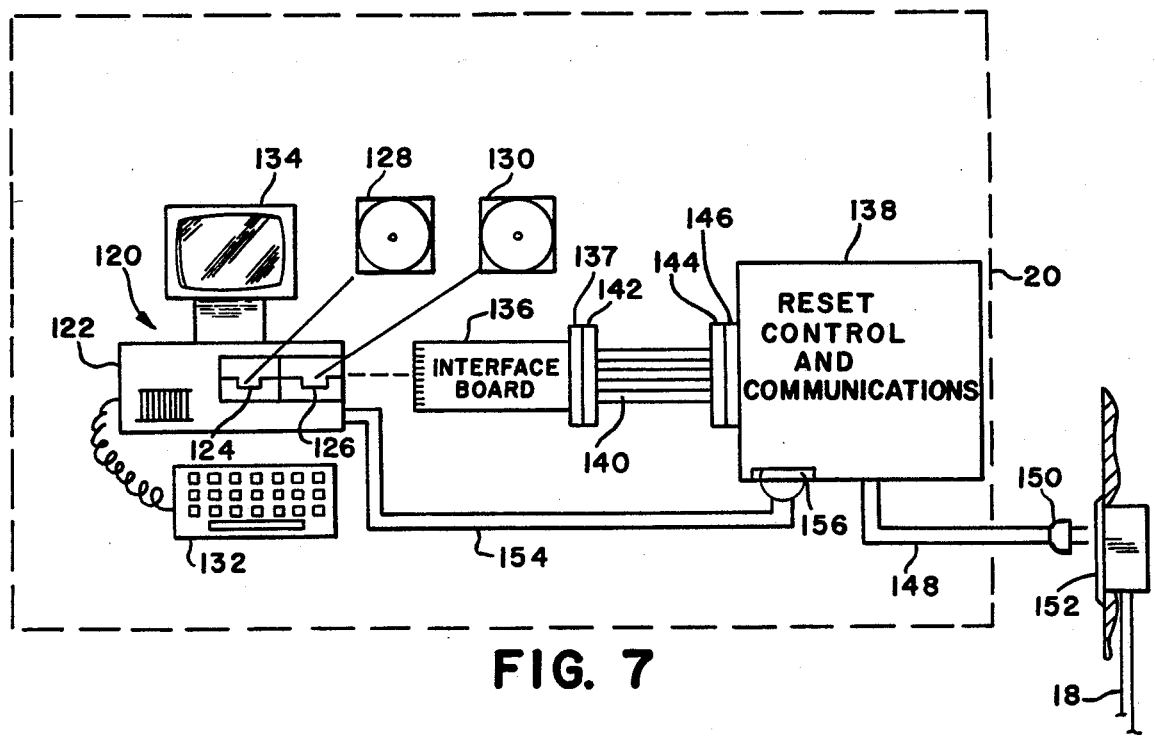
FIG. 7 is a detailed system block diagram of the system control unit for the environmental control system illustrated in FIG. 1.

The program shown illustrates a sample warm weather (Summer) program for pot mum production in a warm location such as the sun belt. The program is intended to conserve energy by using the mechanical cooling of the evaporation pad system only when all other less energy consuming cooling measures have been taken. For example, the side and roof vents are opened progressively through stages 1-5 until the temperature inside the greenhouse exceeds the 84° threshold. In stage 6, the roof vent opening is completely closed to maintain any cooling effect that is provided by turning fan number 1 and the cooling pad pump on. As the temperature increases to 86° at stage 7, the roof vent opening remains closed, the side vent is fully opened, both fans are on, and the cooling pad pump is fully on. It is noted that for a different section of the country, for different growing crops, or even at the same location but under spring, fall, or winter conditions the program would be quite different. The system can advantageously be programmed for all of these conditions or for many other structures, thereby providing the flexibility needed for various situations.

with reference now to FIG. 7 there is shown a system block diagram of the central control unit 20 of the environmental control system. The control unit 20 is processor based which increases system flexibility. The processor system that will be used for illustrating the invention is a personal computer 120. These processor systems are small, relatively portable, and being used for various control applications. The personal computer system generally comprises a processor 122 having a number of peripheral devices for communication and input/output data handling. The processor 122 can be a personal computer having two disk drives 124 and 126 Which support a standard disk operating system. One disk drive, for example, 124 can be used to load the operating system from a disk 128 and the other disk drive 126 can be used to load or read a data disk 130. Operator interface with the processor 122 is provided by a keyboard 132 under control of the person commanding the system. Further included in the personal computer 120 is a CRT or video monitor 134 which provides a text and graphics display for the operator.

In the preferred implementation of the invention the personal computer would be an Apple IIe having a 128k of random access memory divided into 64k of main memory and 64k of auxiliary memory. The operating system used with the Apple IIe, for example, could be Apple DOS version 3.3. Further, the operating system of the personal computer 120 includes an auto-boot such that when the power to the processor is turned on an automatic loading of the environmental control system program occurs from either the system disk 128 or the data disk 130.

It is well known that the Apple IIe personal computer and many other personal computers have expansion slots into which a printed circuit board can be inserted to provide additional peripheral functions. The invention provides an interface board 136 or expansion card which plugs into one of the standard expansion slots on the Apple IIe and thereafter is coupled to a connector 138 which outputs signals to other devices not within the normal personal computer peripheral set. The personal computer 120 through the interface board 136 can communicate with and control a peripheral such as a reset control and communications circuit 138.

To communicate with the reset control and communication circuit 138, the personal computer 120 is provided with a ribbon connector 140. The ribbon connector 140 is terminated on one end by a cable connector 142 and on its other end by a cable connector 144. The cable connector 142 interfaces with the outboard connector 137 of the interface board 136 while the cable connector 144 interfaces with the inboard connector 146 of the reset control and communication circuit 138. The interface board 136 and the ribbon connector 140 provide a convenient means for the personal computer system 120 to bidirectionally communicate with the reset control and communication circuit 138.

Power for the reset control and communication circuit 138 and for the personal computer 120 is provided by a power cord 148 terminated with a plug 150 which can be inserted in a conventional socket 152. The socket 152 is conventionally powered from the AC power line 18 and provides normal 60 cycle AC power to the particular power supplies of the devices 120 and 138. The power cord 154 for the personal computer 120 is plugged into a socket 156 on the reset control and communications circuit 138 and receives power therefrom. Power line 18 is additionally used at the communication path between the central control unit 20 and the peripheral control elements.

The reset control and communications circuit 138 has at least two independent functions and could be provided with more. Preferably, the circuit 138 is an intelligent controller which can be programmed for many peripheral tasks for the personal computer 120.

According to the invention, the reset control and communication circuit 138 is a communication device which receives data and commands via the interface board 136 and ribbon connector 140 and which through a transmitter/receiver, communicates that information over the power line 18 via the power cord 148. A number of peripheral control elements may be attached to the power line 18 and be controlled in this manner. Alternatively, data communications from those peripheral devices can be passed from the reset control and communication circuit 138 via the ribbon connector 140 and interface board 136 to the personal computer 120.

A second function that the reset control and communications circuit 13B provides is a restart function for the host personal computer 120. An operational signal is generated by the personal computer 120 and transferred via the interface board 136 and ribbon connector 140 to the reset control and communications circuit 138. This operational signal is generated periodically by executing a command which accesses the interface board 136 at least once every operational loop of the environmental control program in the personal computer 120.

Because of the periodicity of the loop of the operating code of the program, the operational signal will be generated within a certain time period. The absence of the operational signal within that defined period indicates that the personal computer system 120 has halted or is misexecuting the environmental control program as in an infinite loop. When such a software fault is detected, the power to the power cord 154 is switched off by the circuit 138 and then switched on again to activate the reloading and reinitialization of the environmental control program by the auto-boot of the personal computer 120. A more detailed description of this function is provided in U.S. Ser. No. 654,997, filed on Sept. 26, 1984, in the name of T. Lapp, and entitled Automatic Restart Apparatus for a Processing System, the disclosure of which is hereby expressly incorporated by reference.

Figure 8:
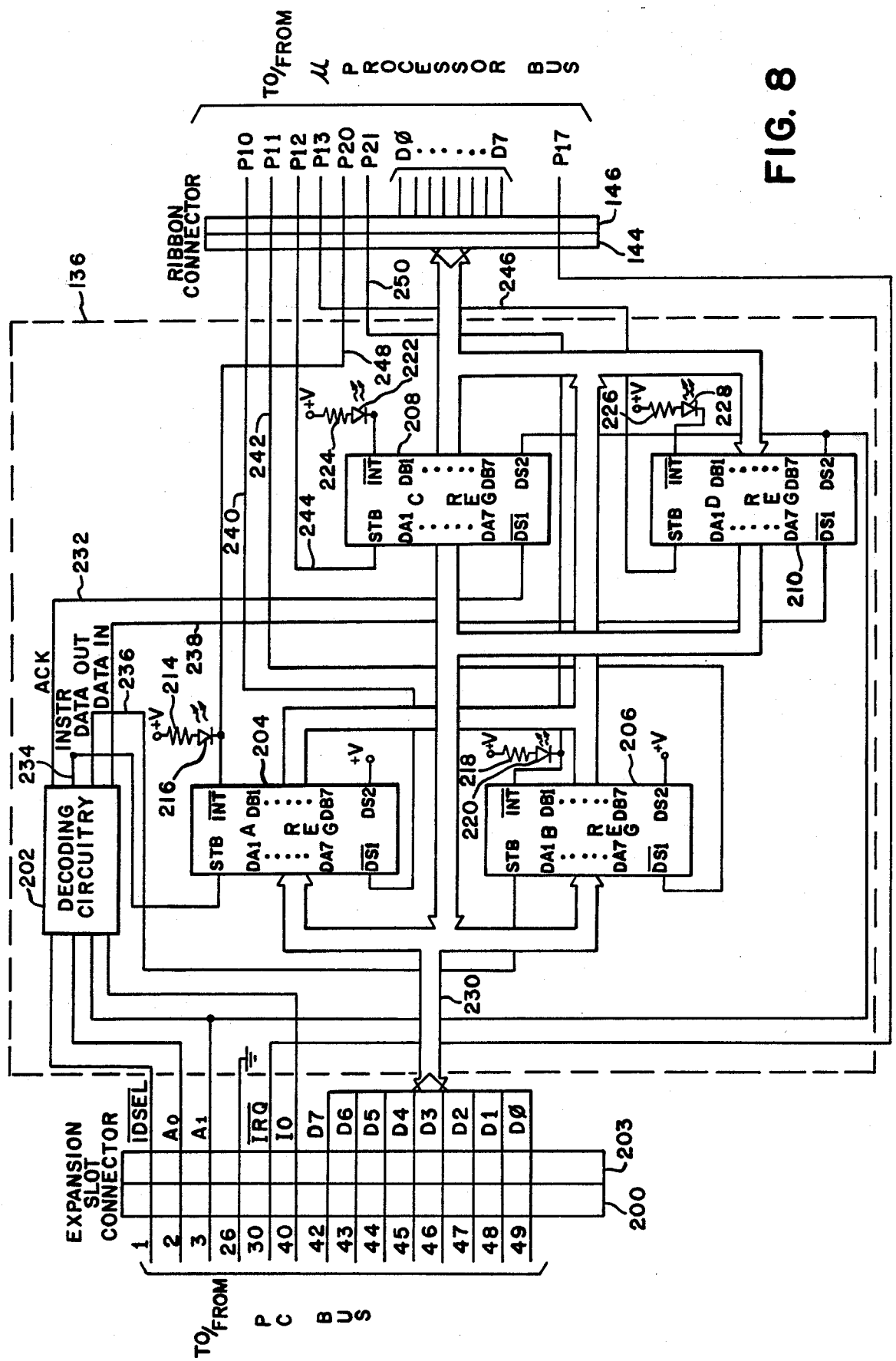
FIG. 8 is a detailed electrical schematic diagram of an interface circuit which inserts into an expansion slot of the personal computer illustrated in FIG. 7.

With respect now to FIG. 8, there is shown the detailed circuitry comprising the expansion card 136 for the personal computer 120. An expansion slot connector 200 connects to the personal computer bus in order to transfer data and control signals which are used by the circuit 138 to provide the data exchange and transmission to the remotely controlled elements. The pin numbers on the left side of the expansion slot connector 200 correspond to those normally found in expansion slot connectors of the Apple IIe personal computer. The signal references correspond to those bus signals which are normally connected to the expansion slots of an Apple IIe personal computer. The connector 200 coupled directly to a connector 203 on the interface board 136 to provide for signal transfer between the devices.

The control line *IOSEL in combination with the address lines A0, A1 provide an addressing scheme to memory map the expansion board 136 and the communication circuit 138 into the memory space of the personal computer 120. The signal *IOSEL and address lines A0, A1 are decoded by address decoding circuitry 202 to become an acknowledge signal ACK on signal line 232, and instruction signal INSTR on signal line 234, an output data signal DATAOUT on signal line 236, and an input data signal DATAIN on signal line 238. These signals allow the personal computer 120 to write to and read from four eight-bit bidirectional registers 204, 206, 208 and 210, respectively, labeled the A register, B register, C register and D register.

The A register and B register have data inputs DA1--DA8 connected to the data bus 230 of the personal computer 120. Data in these registers can be output to the circuit 138 via the outputs DB1-DB8 of the registers. The outputs DB1-DB8 are coupled through connector 144 of the expansion card 136 to the connector 146 of the ribbon connector 140. The data is communicated via the common data bus 230 to the data bus D0-D7 of circuit 138 via the ribbon connector 140. Alternatively, the personal computer 120 reads data from the C register and D register via the data bus 230 and their output lines DA1-DA8 connected thereto. Data is written into the C register and D register by circuit 138 via the data bus D0-D7, the data bus 230, and their input terminals DB1-DB8.

The personal computer 120 writes a command for circuit 138 into the A register 204 by first addressing the particular memory location in its memory space which defines that register and then by writing data on the data bus 230 during a memory cycle. The address selection is a combinaot of the phase zero clock signal $\phi 0$, signal *IOSEL, and address lines A0, A1 which decode into the instruction signal 234. This signal is connected to the STB input of the register 204 and produces a strobe of that input. The strobe signal, which occurs during the memory output cycle, loads the data on the data bus 230 into the A register 204. Similarly, data can be written by the personal computer 120 into the B register 206. During another memory write cycle, the B register is selected by the phase zero clock $\phi 0$, address lines A0, A1, and the *IOSEL signal. These signals are decoded by the decoding circuitry 202 into the signal DATAOUT on line 236 which is input to the STB terminal of the B register. The signal DATAOUT strobes the information that the personal computer 120 has placed on the data bus 230 into the B register.

Data from the circuit 138 which is written into the C register and D register 208 and 210, respectively, is read by the personal computer 120 via the data bus 230 by addressing these two locations in its memory space in combination with the generation of an acknowledge signal ACK and a data in signal DATAIN. To read data from the C register the personal computer 120 addresses the memory looation by generating the acknowledge signal ACK on line 232 to produce a low logic level on the *DS1 input of the C register. During this time the input DS2 of register 208 decodes the address line A1 which is at a high level. This combination of signals produces an output of the information stored in the register 208 onto the data bus 230 via its output lines DA1-DA8. In a similar manner, data can be read from the D register 210 by the personal computer 120 by addressing that memory location. The decoding circuitry generates the data in signal DATAIN which is applied to the *DS1 input of the D register 210. The address line A1 is decoded by the input DS2 and, in combination with the signal DATAIN, causes the register 210 to load its contents onto the data bus 230 so that the information can be input to the personal computer 120.

Figure 10:
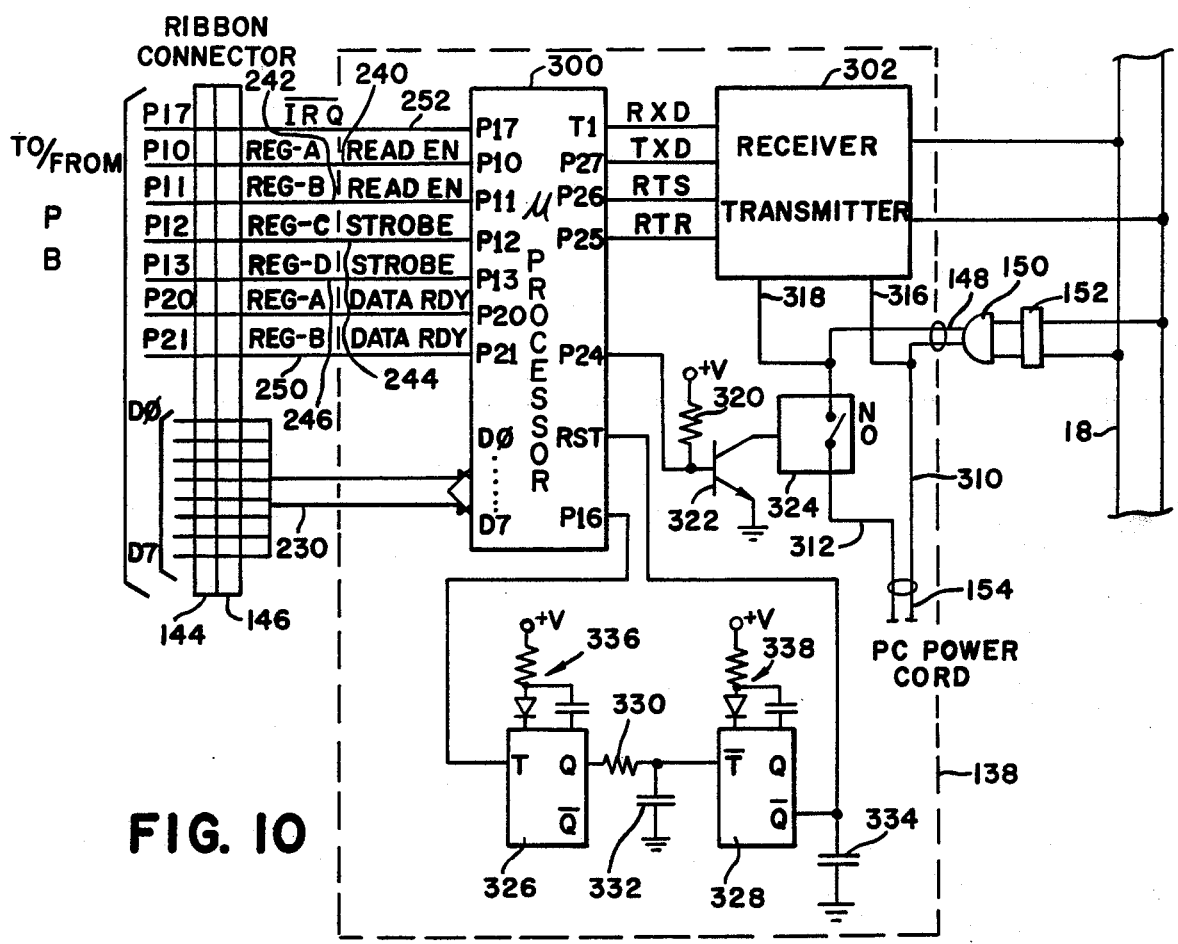
FIG. 10 is a detailed electrical schematic diagram of the reset control and communications circuit of the control unit illustrated in FIG. 7.

The A register, B register, C register and D register are also read from and written to by the circuit 138 by control outputs from a microprocessor 300 (shown in FIG. 10). When data is ready to be read from the A register, the *INT output of the register produces a low level logic signal via line 248 to the input port P20 of the microprocessor 300. The microprocessor 300 decodes this low level signal as a register A data ready indication, and provides an output via its port 1 pin P10 over line 240 to the *DS1 input of the register. This signal, which is an A register read enable, causes the A register to output the information stored therein onto the data bus 230 which can then be transferred via the ribbon connector 140 to the microprocessor 300.

In a similar manner When the B register has information contained therein, it will produce a low logic level signal on line 250 which is input to the microprocessor 300 via pin P21. This signal is recognized by the microprocessor 300 as a B register data ready signal. The microprocessor responds to this signal by producing a low level logic signal on the *DS1 input of register 206 via line 242. This signal is the B register read enable which causes the register to output its stored data onto the data bus 230. When the data is placed on the data bus 230 and communicated through the ribbon connector, it can be read by inputting the information through the D0-D7 terminals of the microprocessor 300.

Data is written to the C and D registers 208, 210 from the microprocessor 300 by outputting data onto the data bus 230 and strobing the desired register to receive the data. The C register strobe is communicated over line 244 from the output terminal P12 of the microprocessor 300 and connects to the STB input of the register 208. Similarly, the D register strobe is output via line 246 from pin P13 of the microprocessor 300 and is received at the STB input of the D register 210.

In this manner, a facile communication between the microprocessor 300 of circuit 138 and the personal computer 120 is maintained. The expansion board 136 appears to be four memory locations in the memory space of the personal computer 120 which can either be read from or written to depending upon the operation desired. The microprocessor 300 views the expansion board 136 as four I/O devices which can be written to or read from in byte form depending upon its operational circumstance. The microprocessor 300 recognizes the I/O devices as providing an interrupt signal when information is ready and service is needed.

Figure 9:
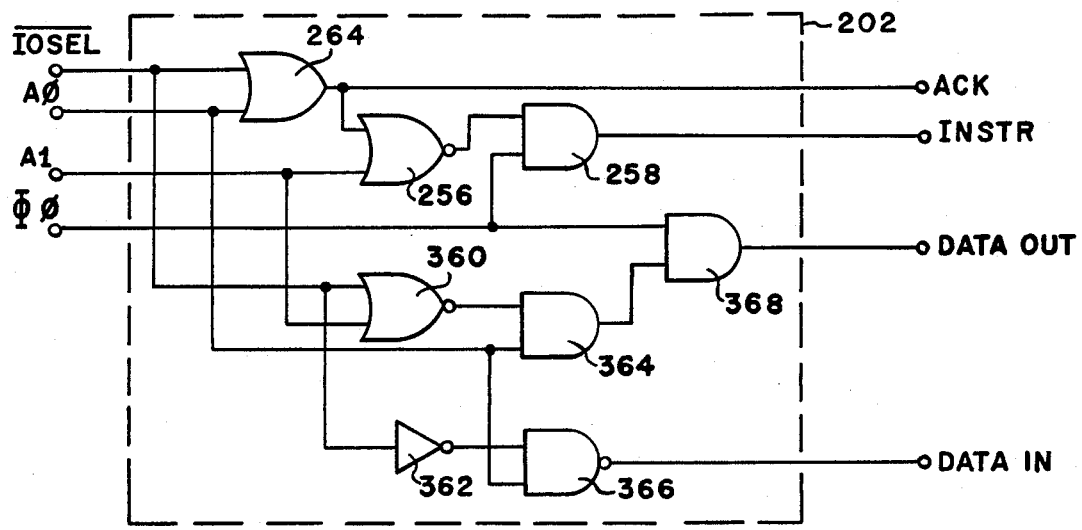
FIG. 9 is a detailed electrical schematic diagram of the decoding circuit of the interface circuit illustrated in FIG. 8.

The address decoding circuitry 202 which generates instructions INSTR, ACK, DATAIN, and DATAOUT is more fully shown in FIG. 9. The instruction signal INSTR uses logic gates 254, 256 and 258 to decode the phase zero clock signal 1, address lines A0, A1 and the input/output select signal *IOSEL. It is seen that the instruction signal INSTR is the combination of a high logic level of A0, a low logic level of the *IOSEL signal, and a high logic level of the phase zero clock 0. The acknowledge signal ACK is formed from the the output of the logic gate 254 which decodes the address line A0 and the *IOSEL signal. The acknowledge signal ACK is the combination of a low logic level of address A0 and the low logic level of the *IOSEL signal. The data out signal DATAOUT is decoded by the gates 260, 264 and 268 providing a logical combination of the address lines A0, A1, the *IOSEL signal, and the phase zero clock 0. The DATAOUT signal is the coincidence of the address A0 and a low level on the *IOSEL signal, and a high level on the phase zero clock 0. Inverter 262 and NAND gate 266 decode the DATAIN signal from the address lines A0, A1 and the *IOSEL signal. The DATAIN signal is the logical combination of address line A0 and the low level of the *IOSEL signal.

With reference now to FIG. 10, the microprocessor 300 communicates with the personal computer 120 as previously described to produce control information to peripheral control elements via a frequency shift keyed data string output through a receiver/transmitter 302. The frequency shift keyed data is output to the peripheral elements over the power line 148 by connection of the receiver/transmitter 302 to the power line through conductors 318 and 316, plug 150 and the common receptacle 152. The receiver/transmitter 302 produces the frequency shift keyed signals from a serial data output from the microprocessor 300 via pin P27 or a transmit data line TxD. By enabling the receiver/transmitter 302 with a ready to send signal RTS via pin P26, the microprocessor 300 is able to output digital data to all of the peripheral control elements over the power line. Data is received from peripheral elements over the power line 18 and that data is demodulated with the receiver portion of the receiver/transmitter 302. After decoding, the information is input to the microprocessor 300 as digital data over a receive data line RxD connected to terminal T1. The received data from the receiver/transmitter 302 is enabled by the microprocessor 300 via the ready to receive signal *RTR.

The microprocessor 300 further controls a normally open solid state relay 324 which has its contacts disposed between a break in the hot conductor 312 of the power cord 148. The hot conductor 312 extends to the personal computer power cord 154. The neutral conductor 310 of the power line 18 is further extended from the plug 150 to the personal computer power cord 150. The control terminal of the solid state relay 324 is connected to the collector of an NPN power transistor 322 whose emitter is grounded. The base of transistor 322 is pulled up by resistor 320 whose other terminal is connected to a source of positive voltage +V. The base of the power transistor 322 is additionally connected to an output pin P24 of port 2 of the microprocessor 300.

Normally, the transistor 322 is conducting and saturated thereby closing the relay 324 to provide a closed circuit and power to the personal computer. The microprocessor 300 by setting pin P24 to a low logic level will sink current from the base of the transistor 322 to turn the transistor off and open the contacts of the relay 324. This action will produce a power down condition for the personal computer 10 by breaking the circuit through the hot conductor 312.

Conversely, a power up condition is provided by setting pin P24 high. This action will cause the transistor 322 to saturate and thereby close the relay contacts and supply power to the personal computer 120.

The microprocessor 300 further is connected to a pair of monostable devices 326 and 328 having timing circuitry 336 and 338, respectively. An output port 1 pin P16 is connected to the trigger input T of the device 326 to provide a strobe which resets the device. As long as the device 326 remains in a reset mode, a low logic level from its Q output is transmitted via a differentiator circuit, comprising resistor 330 and capacitor 332, to the *T input of the device 328. This low level signal maintains the device 328 in a set condition with its Q output low. The Q output of the device 328 is connected to the reset input RST of the microprocessor 300. When the strobes to monostable 326 occur at a frequency greater than the period of its unstable state the monostable 328 will remain reset. However, if the strobes from the output pin P16 exceed the time constant of the monostable 326 then it will reset producing a pulse to the monostable 328 and thus a pulse from the *Q output of that device. The pulse output from monostable 328 is filtered by capacitor 334 before being input to the RST terminal of the microprocessor 300. A pulse from the *Q output of the device 328 will cause a reset of the microprocessor 300 and a branch of the instruction execution to the initialization routine of the program.

Figure 11:
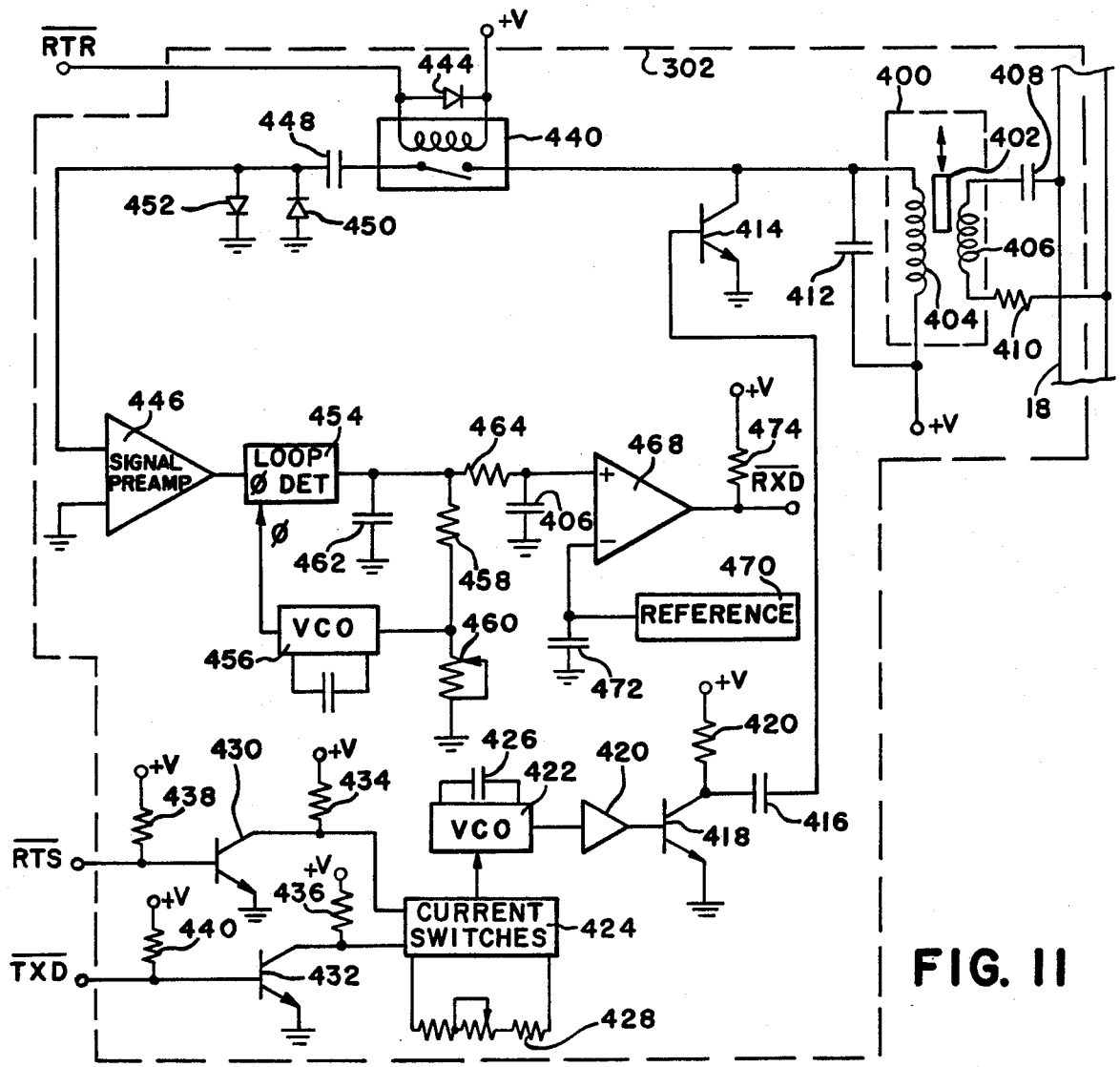
FIG. 11 is a detailed electrical schematic diagram of the circuitry comprising the receiver-transmitter of a communication interface unit for the reset control and communication circuit illustrated in FIG. 10.

FIG. 11 shows the detailed circuitry implementing the communication interface means. The embodiment shown includes both a receiver and transmitter, but it will be seen that either can be used independently without the other. The receiver/transmitter is inductively coupled to the power line 18 by an isolation transformer 400 which has a tuning slug 402 for varying the coupling between the secondary and primary of the transformer. The tuning slug 402 is used to vary the coupling parameter and thereby the inductance of the transformer to fine tune the frequency of the transmission and the frequency for detection of the information. The secondary winding 404 of the isolation transformer 400 is connected to the power line 18 at one terminal through a coupling capacitor 408 and at the other terminal through a load resistor 410. A tuned circuit is provided for the primary winding 404 of the transformer 400 by a parallel capacitor 412 connected in parallel with the winding.

A transmit channel is coupled to the low voltage terminal of the primary winding 412 of the isolation transformer 400 via a NPN transistor 414. The transistor 414 by being switched on and off produces a oscillation in the tuned circuit comprising the primary winding 404 of the transformer and the capacitor 412. The oscillating voltage which switches the transistor 414 on and off is provided to the base of the device through a coupling capacitor 416 from a common emitter amplifier comprising an NPN transistor 418 and a collector resistor 420. The common emitter amplifier is driven by a linear preamplifier 420 which amplifies the output of a voltage controlled oscillator 422.

The voltage controlled oscillator 422 produces one of two frequency tones depending upon the digital input of the microprocessor on the transmit line TxD and the ready to send line RTR. The voltage controlled oscillator 422 outputs a frequency dependent upon the current input from a current matrix comprising switches 424 and the value of a timing capacitor 426, and a network of timing resistors 428. The present configuration allows four different frequencies to be output. The frequencies are selected by the two digital inputs from the ready to send enable line RTR and the transmit data line TxD. The digital inputs from these lines are amplified by common emitter amplifiers comprising NPN transistors 430 and 432 with collector resistors 434 and 436 respectively. Base resistors 438 and 440 are supplied with a positive bias voltage +V which normally produces conduction from the transistors and a 00 digital input to the current switches 424.

When the microprocessor 300 of the communication circuit 138 wishes to send information over the power lines, it will lower the ready to send signal and produce a high logic level from the inversion of the amplifier 430 on the input IA. This high level on the input IA will select the two higher frequencies of the VCO to be the FSK frequency output. Because the data line TxD is generally at a high logic level the terminal IB will be at a low logic level and thus provide the higher FSK frequency for digital data which are ones. By lowering the data line Txd for digital bits, the VCO 426 will change frequencies to its lower frequency and output FSK zeros. The FSK signal is coupled through the amplifiers 420, 418 and the transistor 414 to the isolation transformer 400 and onto the power lines to be received by the peripheral control elements.

The second portion of the communication interface is a receiver channel which is normally disconnected from the isolation transformer 400 by means of a relay 440 when the communication interface is transmitting. The relay contacts are closed by drawing current through the coil 442 of the relay via the ready to transmit enable line TxEN. A diode 444 is poled across the coil 442 of the relay 440 to absorb the inductive spike when the RTS line is released. Frequency shift keyed signals are coupled to a signal preamplifier 446 via a coupling capacitor 448 and clipping diodes 450 and 452. The clipping diodes prevent the input signal to the preamplifier 446 from exceeding a predetermined level of 0.6 V. The output of the signal preamplifier 446 is coupled to a loop phase detector 454 which outputs a signal dependent upon the phase difference between the input signal and the output signal of a voltage control oscillator 456. The frequency of the voltage control oscillator 456 is controlled by a voltage developed between a filter resistor 458 and filter resistor 460.

The filter resistors 458, 460 in combination with a capacitor 462 form a filter which is frequency sensitive to the tone or FSK bit that is being detected. The VCO 456 phase detector 454 form a phase locked loop which outputs a certain voltage level if the correct tone frequency is being received. Otherwise, the voltage level output from the phase detector 454 is lower. This output level is passed through another filter comprising resistor 464 and capacitor 466 to the noninverting input of a comparator 468. The inverting input of the comparator 468 is connected to a reference voltage 470 in combination with a capacitor 472. The comparator 468 compares the filtered voltage from the loop phase detector 454 with the reference voltage 470 and produces a logic level 1 or 0 on its output depending upon the detection of the correct tone. The output of the comparator 468 is supplied with a pull up resistor 474 which drives the received data line RxD.

It is seen that the receiver/transmitter combination provides an advantageous communication interface for transforming serial digital data to frequency shift keyed information and for decoding frequency shift keyed information into serial digital data. The device is suitable for many uses and will operate on many frequencies but preferably a tone of 205 KHZ is a digital one and a tone of 195 KHZ is a digital zero. The relay 440 maintains the receiver portion of the apparatus in a disabled condition only while the transmitter is operative. This allows a greater communication distance over the power lines as the transmitter does not perceive a loading from the receiver which would be detrimental at such a close distance.

Figure 12A:
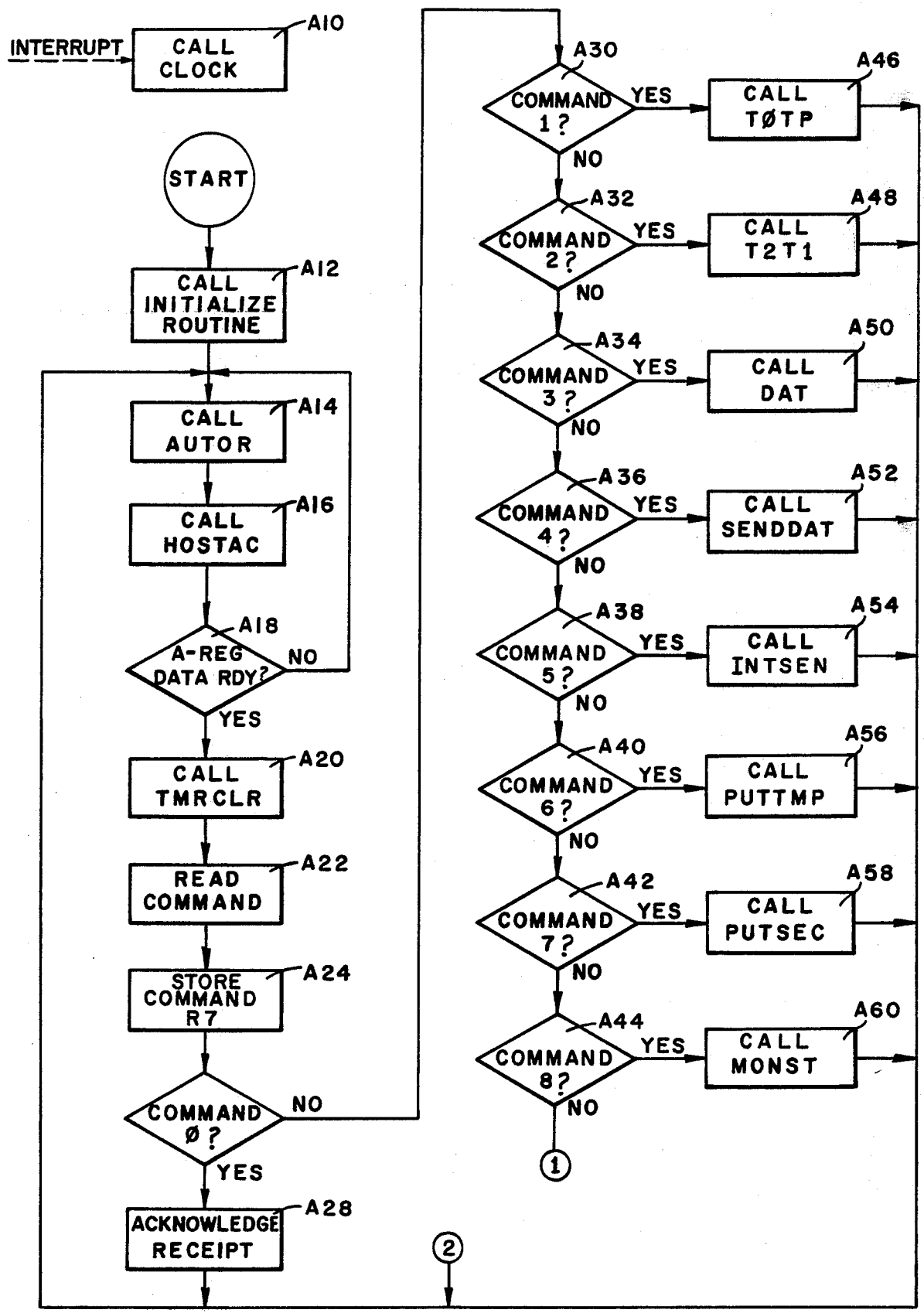
FIGS. 12a and 12b, together, form a system flowchart of the software executed by the microprocessor of the reset control and communications circuit illustrated in FIG. 10.
Figure 12B:
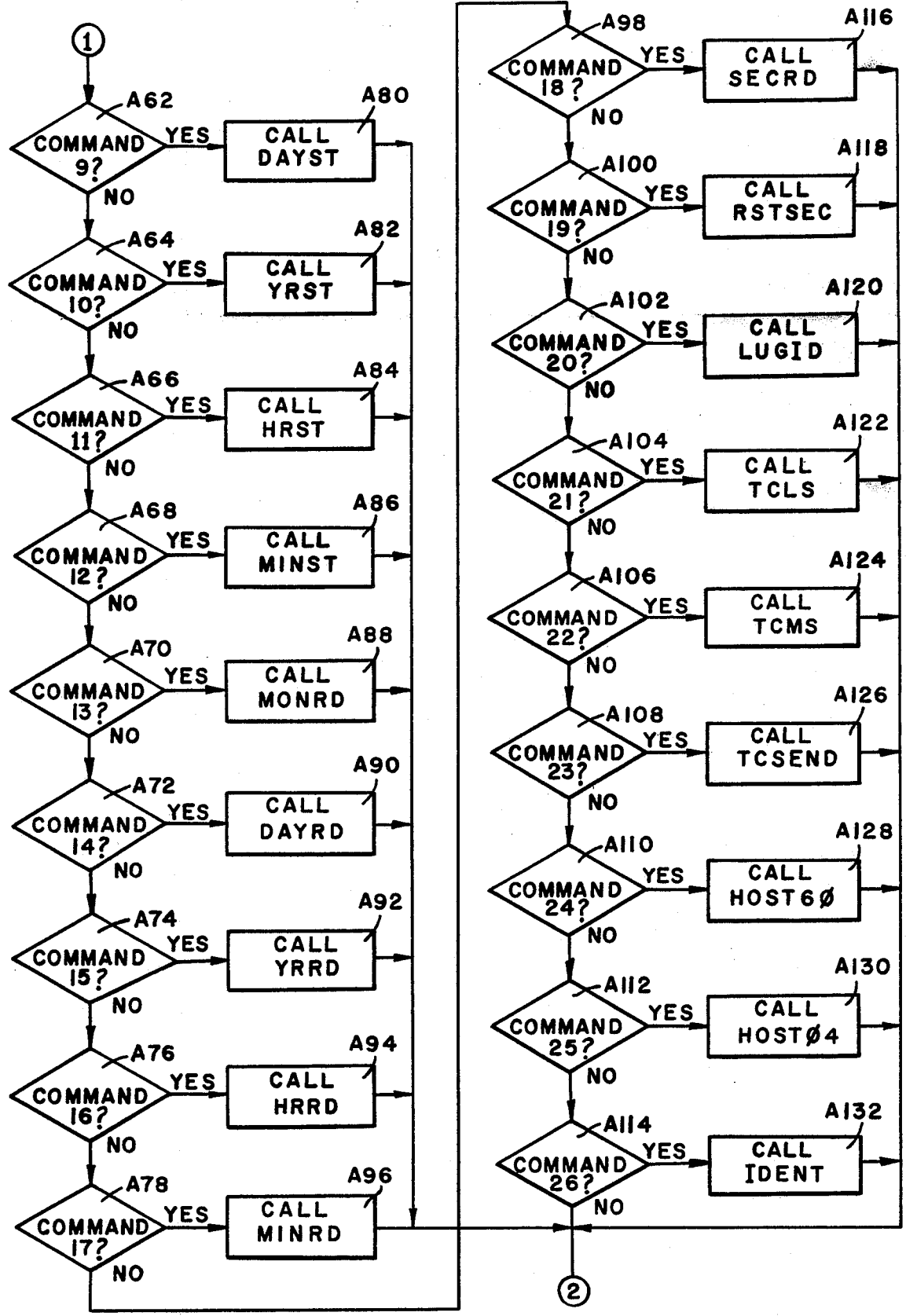

A system flowchart for the program contained within the microprocessor 300 will now be further explained with respect to FIGS. 12A and 12B. The system program begins in block A12 where an initialization routine is called which initializes the C register. The C register is used to flag changes to the personal computer and the initial clearing begins the process. The routine in block A12 also clears the data ready flags from the A and B register by reading the contents from both of those registers. Further the routine clears the timer for the power control program to enable the checking on the status of the personal computer software and loads a four-minute time-out default value for that program. The program thereafter transfers control to block A14 where a subroutine for the auto-reset function, AUTOR, is called. The auto-reset subroutine AUTOR is a self-test routine which performs a series of additions from constants stored in the RAM of microprocessor 300 and tests that sum with a constant to determine if the memory is operating correctly or has lost data. If the test is valid then the routine will strobe the monostable devices 326, 328 (FIG. 10) to maintain the program sequence. If the RAM test is failed and it is determined that there may be bad data in memory, then the strobe to the monostables is terminated and a time-out will occur where the program will cause a reset and a return to the initialization routine.

Thereafter, in block A16 the program will call the subroutine HOSTAC. This program maintains control of tho power supply to the personal computer 120 (FIG. 7) and checks a time-out register to determine if more than a predetermined duration of cycles has passed since the last communication from the personal computer 120. If the time-out has been reached, then the subroutine HOSTAC will turn power off to the host personal computer 120 and, after a delay, turn the power back on the personal computer thereby producing a power down and power up cycle which causes the auto boot to reload the environmental control program in the personal computer.

The program continues in block A18 where a register data ready signal is tested. If there is no data in A register then the program transfers control back to block A14 and continues in this loop until the data ready flag has been set. Thus, if no data ready flag is set within the time-out period of the subroutine HOSTAC the host personal computer 120 will be reloaded with the environmental control program and restarted. However, if the A register data ready flag occurs within the time period of the HOSTAC program the affirmative ranch from block A18 will produce a call to the subroutine TMRCLR in block A20. This subroutine will clear the timer of the power supply control subroutine HOSTAC and allow the system to operate normally.

Since the A register has indicated that data is contained therein, in block A27 a command for the system is read into microprocessor 300 from the A register. This command is then stored in the internal register R7 of microprocessor 300 in block A24 by a transfer from the A register over the data bus to that register. The received command thereafter is tested in a number of blocks A26–A114 to determine what the personal computer 120 is requesting the system to do. If the received command word is zero in block A26 the microprocessor 300 merely acknowledges receipt of the command in block A28 and returns to the main loop by transferring control to block A14.

The following tests in blocks A30–A132 decode the input command into a number of branch codes which call suhroutines to produce the particular operation desired. If the command is equal to 1, tested in block A30, then the subroutine TOTP is called in block A46 to obtain the prefix byte from the B register and store it in the correct place in the RAM of the microprocessor 300. With a command of 2, as tested in block A32, the suffix byte T2T1 is read from the B register and placed in the correct RAM location of microprocessor 300 in block A48. If the command is 3, as tested in block A34, then the subroutine DAT called in block A50 takes a peripheral control element command byte D D1 from the B register and stores it in the correct location in the RAM of microprocessor 300.

These three commands, 1, 2, and 3, provide for the storage of sensor and actuator communications from the central control unit as described in the protocol of FIGS. 3A-3C. The decoding program upon sensing a command 4, in block A36, calls the subroutine SENDDAT in block A52 to send a command to a remote actuator. The SENDDAT routine assembles the stored information TOTP, TIT2, D0D1, and controls the communication interface 302 to output the data in frequency shift keyed format. If the command is decoded a 5 in block A38, then the microprocessor 300 will perform an interrogation of the sensor by calling the subroutine INTSEN in block A54. The subroutine INTSEN first transmits the interrogation bytes T TP, TIT2 and decodes the reply data bytes D0D1, D2D3 to perform this operation.

Commands decoded as a 6 or 7 in blocks A40 and A42, respectively, cause the microprocessor 300 to call subroutines PUTTMP and PUTSEC in blocks A56 and A578, respectively. These two operational sequences transfer the first and second bytes of information D0D1, D2D3 returned from a sensor into the D register. Once the sensor data is stored in the D register of the interface board the personal computer 120 can read it and perform the control computation necessary for the environmental control.

Commands 8-12, decoded by blocks A44, A62, A64, A66 and A68, respectively, take a byte of data from the B register relating to the month, day, year, hour and minute as set by the personal computer 120 and load these variables into particular RAM locations in microprocessor 300 to provide a real time clock. Commands 14-18 as decoded by blocks A72, A74, A76, A78, A98, respectively, Will cause the real time clock to be loaded byte by byte into the D register where the personal computer can read it. Command 13 places the current month byte in the D register, by a call to subroutine MONRD in block A88, while commands 14-18 place the current day, year, hour, minute and second in the D register by calling the subroutines DAYRD, YRRD, HRRD, MINRD, and SECRD in blocks A92, A94, A96 and A116, respectively. A command equal to 19 is sensed by block A100 and produces a call to the subroutine RSTSEC in block 118 which causes a reset of the second counter in the real time clock to zero.

Commands 20-23 which are decoded in blocks A102, A104, A106, and A108, respectively, are used to control the multifunction address receiver which contains several timable and controllable states for an actuation address. Command 20 calls the subroutine LUGID to store a byte for the identity of the actuated device (particular watering head) that the personal computer 120 wishes to command. The operation takes information from the B register and stores it in a particular RAM location in microprocessor 300. Commands 21 and 22 call subroutine TCLS and TCMS in blocks A122, A124, respectively, to transfer the least significant and most significant bytes of data for the addressed multifunction receiver function to the correct locations in random access memory of microprocessor 300 from the B register. The bytes describe the amount of time the selected function should be operated. Command 23 as decoded in block A108 causes a call to the specialized subroutine TCSEND in block A126. The subroutine TCSEND is used to send the data information to control the multifunction address receivers by the format TOTP, TIT2, D0D1, D2D3, D4D5.

Commands 24 and 25, as decoded in blocks A110 and A112, call either subroutines HOST60 in block A128, or HOST04 in block A130. These provide a way of setting the HOST personal computer time-out constant to either four minutes or one hour, respectively. Block A114 decodes the command 26 and is used to call the subroutine IDENT Which provides an equipment ID number for placement into the D register. The equipment ID is used by the personal computer to determine the version of software which should be used with the particular physical configuration of the system.

FIG. 13 illustrates a RAM map of the microprocessor 300 where the communications information between the personal computer 120 and the system is stored. The automatic reset check file is stored at locations 36-40 (Decimal), the reset timer is stored in locations 41-43, the information for multifunction address receivers is stored in locations 46-48, the host power control timer is stored in location 49, the real time clock is stored in locations 50-56, and system communication information is stored in locations 57-63.

Figure 14:
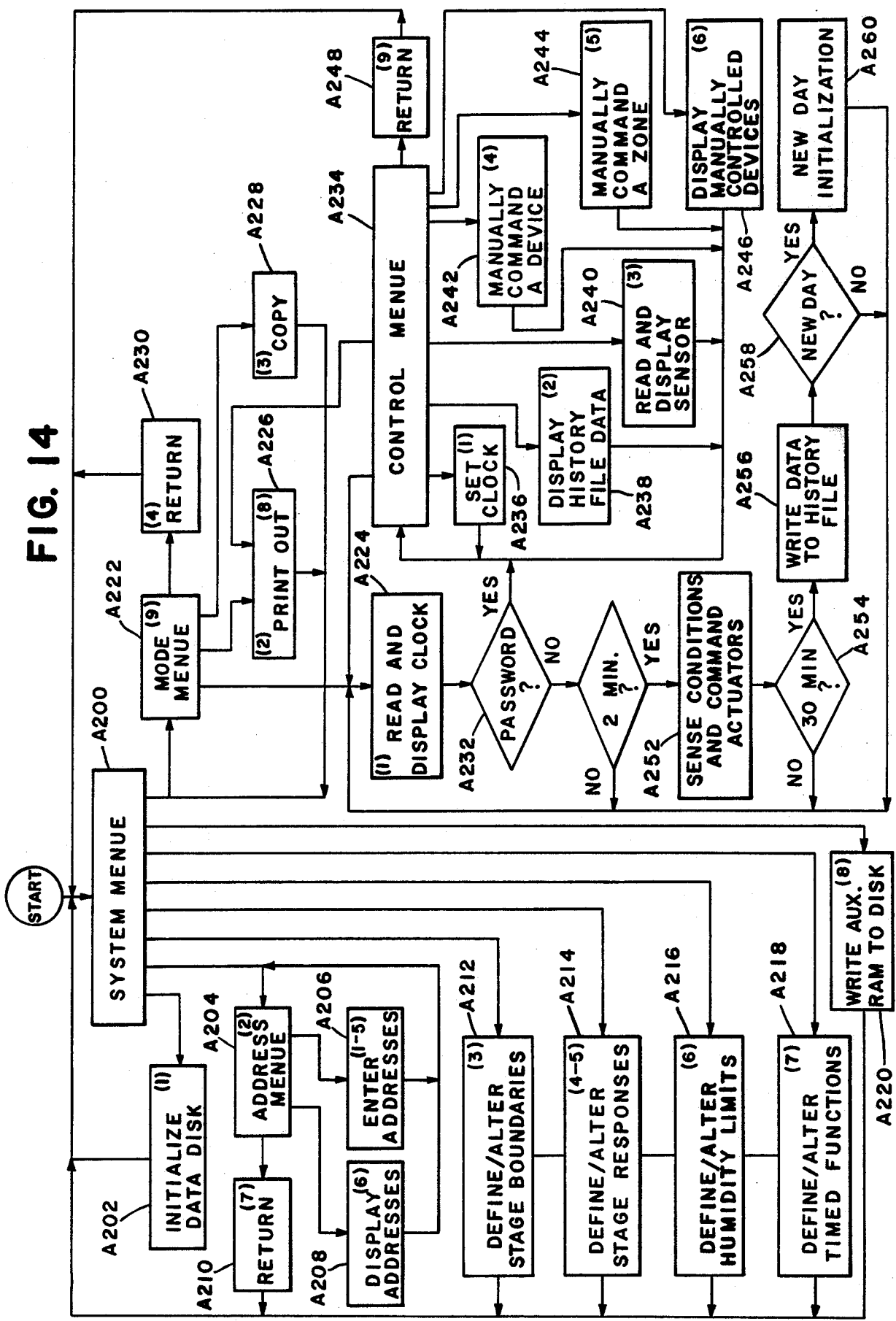
FIG. 14 is a detailed system flowchart of the software executed by the personal computer of the system control unit illustrated in FIG. 7.

A system flowchart for the program stored in the personal computer 120 embodying the environmental control application program will now be more fully disclosed with respect to FIG. 14. The program initiates in block A200 where a system menu is displayed on the CRT monitor 134 to provide the operator a number of options from which to control the system. The first option is the ability to initialize a data disk on which historical data from the system may be written. With this historical data, the operator may better program the system and control the environment with more specificity.

If the operator chooses option 2, then the system menu block A200 transfers him to an address menu in block A204. In this operation the address menu having seven options is displayed to provide a system configuration or assignment routine. If the operator chooses options 1-5 of the address menu, then he will enter a program specified by block A206 which allows the peripheral control elements to be assigned to a particular address. The separate options provide for distinguishing the different types of equipment by prefix and are subdivided into remote sensor controllers, vent motor controllers, address controllers, and multi-function address receivers. The sixth option of the address menu of block A204 transfers control of the program to block A208 where any of the addresses for the assigned peripheral control elements may be displayed on the CRT monitor 134. The address menu and associated programmed options thereby are used to configure the system equipment for each zone by the assignment of addresses. The seventh option of the address menu of block A204 is a return through block A210 to the system menu of block A200 for a further selection of the system operations.

Options 3-7 of the system menu of block A200 are used to modify or define in the first instance the temperature control program of the system. Option 3 in block A212 allows the operator to define/alter the temperature stage boundaries for both the day and night programs. Options 4 and 5 in block A214 are used to alter/define the operational conditions or responses of the peripheral control elements during a particular stage. Option 4 is differentiated from option 5 by allowing the operator to program the stage responses for both day and night programs.

The humidity limits of the control are modified or defined, in the first instance, by addressing block A216 through the system menu with the option 6. Likewise, the timed functions of the multifunction address receivers for the control program may be defined or altered in block A218 by requesting option 7 from the system menu. The time functions include the operations of misting for a particular timed duration, etc.

The eighth option of the system menu shown in block A200 will transfer control to a part of the system program which allows the operator to write the information stored in the auxiliary RAM onto one of the floppy disks. This operation is shown functionally as block A220 and is used to transfer the system configuration information to a data disk where it can be stored for future use.

The ninth and final option is a mode menu which displays a separate menu having four options as detailed in block A222. The first option of the mode menu transfers to control to block A224 which begins the actual environmental control loop of the system. In block A224 the operation of reading and displaying the real time clock clock on the CRT monitor is accomplished. Next, in block A232, the system checks to determine whether the operator has input a correct password to perform certain manual functions with the system. The password is the key for obtaining the entry into a control menu in block A234. Otherwise, if the first option is chosen from the mode menu A222 and the clock has been displayed and no password has been found, then the program determines whether two minutes from the last pass through this loop has occurred.

The two-minute time is a frame reference time which allows the sensors of the peripheral control elements to be interrogated and read, and the actuators of the peripheral control elements to be commanded at least once every frame. Therefore, if the two-minute period is up, the affirmative branch from block A250 takes the program to block A252 where all sensors of a zone are interrogated and all actuators are commanded. The control program then continues in this manner until all zones have been controlled. Once the control loop is executed, the program continues to a test in block A254 where a 30-minute time limit is tested for. If the 30-minute time limit is not exceeded, then the program returns to block A224 and the sequence repeated until the 30-minute timer times out.

This operation provides a control loop where the sensors read the actual temperature and the control program determines a temperature stage from a day or night program based on the sensed conditions. The stage chosen indicates the operating conditions of the peripheral control elements which are configured as actuators. Tho actuators are then commanded as previously indicated to assume the stored operational conditions. This control loop is executed every two minutes in accordance with the disclosed program.

However, every 30 minutes, a side loop is executed where block A256 writes certain data of the system to the history file. Thereafter, the program determines from the real time clock whether or not the present time indicates that a new day should be started. If the answer to the test in block A258 is negative, then the program returns to the control loop beginning in block A224. If, however, the time of the real time clock is the start of a new day, for example, the arbitrarily chosen time of 4:30 a.m., a new day initialization routine, as shown in block A260, is executed prior to reentering the control loop. The sequence of operation of the control loop is then that the sensors and actuators are accessed every two minutes, while the history file is written into every 30 minutes and the initialization for the subroutine is done once every 24 hours.

At any time in the control loop, the operator may enter a password and have a control menu, as shown in block A234, displayed on the CRT monitor 134. The control menu has nine options which are selected by the operator choosing the particular option and keying in the identification numbers from the keyboard of the personal computer 120. The first operation, as shown in block A236, allows the operator to set a time on the real time clock. The second option is one that permits the operator to display the data in the history file by keying in he option in block A238. In a similar manner, the third option can be used to read and display the value of a sensor, as illustrated in block A240. The control menu, as disclosed in block A234, further provides for the manual command of a device, or the manual command of a zone, as shown in blocks A242 and 244, respectively. These functions are called by choosing or selecting options 4 and 5 on the control menu. As a sixth option, the control menu allows the operator to display the descriptions and operational conditions of the manually controlled devices in block A246.

If the operator wants to return to the control loop from the control menu, then an option 7 is provided to transfer the program sequence from block A234 to block A224. As an eighth option, the control menu A234 allows for the printout of data from block A226. The ninth and last option of the control menu is a return through block A248 to the system menu A200.

While a preferred embodiment of the invention has been illustrated, it will be obvious to those skilled in the art that various modifications and changes may be made thereto without departing from the spirit and scope of the invention as defined in the appended claims.

We claim:

1. A control system including:
   a plurality of remotely controlled peripheral control elements for sensing at least one operating parameter of a plant and for controlling at least one operating parameter of said plant in response to said sensed parameter;
   a computer system including a processor, a disk operating system, an operator input means, and a visual monitor, for configuring a control program, for interrogating said at least one peripheral control element for sensing, and for commanding said at least one other peripheral control element for actuating according to said control program;
   a communication means, including a memory, for receiving information from said computer system in combination with commands for said communication means, for decoding said commands and storing said received information in said memory, for transmitting said received information to said peripheral control elements, for further receiving information from said peripheral control elements and storing said information in said memory, and for transmitting said stored information to said system processor;

means for interfacing between said system processor and said communication means; and means for interfacing between said communication means and said peripheral control elements, said communication means being based on a microprocessor and said means for interfacing between said system processor and said communication means including:

a plurality of bidirectional data registers having a port connected to at least one of the data bus of said system processor and the data bus of said communications processor;

means for loading data into said registers from said system processor bus;

means for reading data from said registers onto said system processor bus;

means for loading data into said registers from said communication processor bus; and means for reading data from said registers onto said communications processor bus.

2. A control system as defined in claim 1 wherein said data registers includes:

a command register, for storing commands for said communication means, having an input connected to said system processor bus and an output connected to said communication bus; and an information register, for storing control information for said peripheral control elements, having an input connected to said system processor bus and an output connected to said communication bus;

said means for loading information from said system processor bus causing the storage of the communication command and control information into said command and information registers; and said means for reading information onto said communications processor bus causing the output of the communication commands and control information from said command and information registers.

3. A control system as defined in claim 2 wherein said plurality of data registers include:

an acknowledgement register, for storing an acknowledgement indicative of the receipt of a command by said communication means, having an input connected to said communications bus and an output connected to said system processor bus; and a data register, for storing information from said peripheral control elements, having an input connected to said communications bus and an output connected to said system processor bus;

said means for loading data from said communications bus causing the storage of said acknowledgement and peripheral control information in said acknowledgement and data register; and said means for reading information onto said system processor bus causing the output of the acknowledgement and peripheral control information from said acknowledgement and data registers.

4. A control system as defined in claim 3 wherein:

each remotely controlled peripheral control element adapted for sensing is interrogated by said system processor by generating a command to said communication means to store the address of the peripheral control element to be interrogated, by generating a command to said communication means to interrogate said peripheral control element, and bus receiving a reply, and by generating a command to said communication means to transmit the reply to said system processor.

5. A control system as defined in claim 3 wherein:

each remotely controlled peripheral control element adapted to control said at least one operating parameter is controlled by said system processor by generating a command to said communication means to store the address of the peripheral control element to be controlled, by generating a command to said communication means to store a command for the peripheral control element to be controlled, and by generating a command to said communication means to transmit said stored address and command to said peripheral control element.

* * * * *